(12) United States Patent
Takeshita et al.

(10) Patent No.: US 12,116,466 B2
(45) Date of Patent: Oct. 15, 2024

(54) LAMINATE AND PRODUCTION METHOD THEREFOR

(71) Applicants: NIKON-ESSILOR CO., LTD., Tokyo (JP); SUMITOMO CHEMICAL COMPANY, LIMITED, Tokyo (JP)

(72) Inventors: Katsuyoshi Takeshita, Tokyo (JP); Hideyuki Wakiyasu, Tokyo (JP); Tomohiro Ito, Osaka (JP); Tomonori Miyamoto, Osaka (JP); Masayoshi Tokuda, Osaka (JP)

(73) Assignees: NIKON-ESSILOR CO., LTD., Tokyo (JP); SUMITOMO CHEMICAL COMPANY, LIMITED, Tokyo (JP)

( * ) Notice: Subject to any disclaimer, the term of this patent is extended or adjusted under 35 U.S.C. 154(b) by 297 days.

(21) Appl. No.: 17/605,095

(22) PCT Filed: Apr. 22, 2020

(86) PCT No.: PCT/JP2020/017341
§ 371 (c)(1),
(2) Date: Oct. 20, 2021

(87) PCT Pub. No.: WO2020/218342
PCT Pub. Date: Oct. 29, 2020

(65) Prior Publication Data
US 2022/0220270 A1    Jul. 14, 2022

(30) Foreign Application Priority Data

Apr. 26, 2019  (JP) ................................. 2019-086595

(51) Int. Cl.
| | | |
|---|---|---|
| *C08J 7/04* | (2020.01) | |
| *B05D 1/00* | (2006.01) | |
| *B05D 3/10* | (2006.01) | |
| *B05D 5/08* | (2006.01) | |
| *C03C 17/34* | (2006.01) | |
| *C09D 183/04* | (2006.01) | |
| *G02B 1/111* | (2015.01) | |
| *G02B 1/14* | (2015.01) | |
| *G02B 1/18* | (2015.01) | |

(52) U.S. Cl.
CPC ............... *C08J 7/042* (2013.01); *B05D 1/60* (2013.01); *B05D 3/10* (2013.01); *B05D 5/086* (2013.01); *C03C 17/3405* (2013.01); *C09D 183/04* (2013.01); *G02B 1/111* (2013.01); *G02B 1/14* (2015.01); *G02B 1/18* (2015.01); *B05D 2203/35* (2013.01); *B05D 2506/10* (2013.01); *B05D 2518/10* (2013.01); *C03C 2217/73* (2013.01)

(58) Field of Classification Search
None
See application file for complete search history.

(56) References Cited

U.S. PATENT DOCUMENTS

| | | | |
|---|---|---|---|
| 2018/0230331 A1* | 8/2018 | Harada | .................... C09D 7/40 |
| 2019/0048229 A1 | 2/2019 | Sakurai et al. | |
| 2020/0056079 A1 | 2/2020 | Takeuchi et al. | |

FOREIGN PATENT DOCUMENTS

| | | | | |
|---|---|---|---|---|
| CN | 108463491 A | 8/2018 | | |
| JP | 9-258003 A | 10/1997 | | |
| JP | 2004145283 A | * | 5/2004 | ............. G02B 1/105 |
| JP | 2010-217630 A | 9/2010 | | |
| JP | 2015-120253 A | 7/2015 | | |
| JP | 2017-39928 A | 2/2017 | | |
| JP | 2017-170827 A | 9/2017 | | |
| JP | 2018-31000 A | 3/2018 | | |
| TW | 201900792 A | 1/2019 | | |

(Continued)

OTHER PUBLICATIONS

Machine translation of JP 2010-217630 A (Year: 2010).*
Machine translation of JP 2004-145283 A (Year: 2004).*
Machine translation of JP 9-258003 A (Year: 1997).*
Chinese Office Action and Search Report for Chinese Application No. 202080030045.7, dated Mar. 25, 2023, with an English translation.
Extended European Search Report for European Application No. 20794036.2, dated Jun. 30, 2023.
International Search Report for PCT/JP2020/017341 mailed on Jul. 28, 2020.
Japanese Notice of Reasons for Refusal for Japanese Application No. 2021-516161, dated Oct. 4, 2023, with an English translation.

(Continued)

*Primary Examiner* — Ramsey Zacharia
(74) *Attorney, Agent, or Firm* — Birch, Stewart, Kolasch & Birch, LLP

(57) ABSTRACT

An object of the present invention is to provide a laminate which has a substrate, an intermediate layer, and a water-repellent layer laminated in this order, and has excellent abrasion resistance. The present invention is a laminate comprising: a substrate (s) having an anti-reflection layer; an intermediate layer (c) placed on the anti-reflection layer side of the substrate; and a water-repellent layer (r), in this order, wherein the intermediate layer (c) is a cured layer of a mixture composition (cc) of an organosilicon compound (C), or a vapor deposition layer of the organosilicon compound (C), the organosilicon compound (C) contains a silicon atom together with an amino group and/or an amine skeleton, the water-repellent layer (r) is a cured layer of a mixture composition (ca) of an organosilicon compound (A) in which a monovalent group having a perfluoropolyether structure is bound to a silicon atom through a linking group or without a linking group located therebetween, and a hydrolyzable group is bound to the silicon atom through a linking group or without a linking group located therebetween, and the laminate satisfies the following requirement (1), (1) a water sliding angle is not larger than 50° after a abrasion resistance test in which a 200 g load per 1.5 cm×1.5 cm area is applied to a surface on the water-repellent layer (r) side of the laminate and the surface is rubbed 20,000 times.

11 Claims, No Drawings

(56) References Cited

FOREIGN PATENT DOCUMENTS

| WO | WO-2016076245 A1 * | 5/2016 | ............. C03C 17/30 |
|----|----|----|----|
| WO | WO 2017/122616 A1 | 7/2017 | |
| WO | WO 2018/155324 A1 | 8/2018 | |
| WO | WO 2019/093259 A1 | 5/2019 | |

OTHER PUBLICATIONS

Canadian Office Action for Canadian Application No. 3,137,292, dated Jan. 8, 2024.
Chinese Office Action for Chinese Application No. 202080030045.7, dated Dec. 27, 2023, with an English translation.
Taiwanese Office Action and Search Report for Taiwanese Application No. 109113543, dated Dec. 5, 2023, with an English translation.
Korean Office Action for Korean Application No. 10-2021-7038092, dated Jun. 25, 2024, with an English translation.

* cited by examiner

LAMINATE AND PRODUCTION METHOD THEREFOR

TECHNICAL FIELD

The present invention relates to a laminate and a production method therefor.

BACKGROUND ART

A fluorine-based water-repellent coating film typified by a coating film that is formed from a composition containing a compound which has a perfluoropolyether structure has a very low surface free energy, and is thus used as antifouling coating, water/oil repellent coating, and the like in various fields for display devices such as touch panel displays, optical devices, semiconductor devices, construction materials, window glass for automobiles and buildings, and the like.

A water-repellent coating film is formed and used on a substrate in general. When a composition for forming the water-repellent coating film is applied to the substrate, the composition may be applied after another layer such as a primer layer is previously formed on the substrate to form antifouling coating or water/oil repellent coating.

For example, Patent Literature 1 discloses a hard coat film in which a hard coat layer (X), a primer layer (Y), and a surface layer (Z) are sequentially laminated on at least one surface of the substrate, and the surface layer (Z) has a water contact angle of not less than 110°. It is indicated that a fluorine-based compound having a polyperfluoropolyether chain is preferably used in order to form the surface layer (Z), and a silane compound such as 3-acryloxypropyltrimethoxysilane is preferably used in order to form the primer layer (Y).

CITATION LIST

Patent Literature

Patent Literature 1: JP2015-120253A

SUMMARY OF THE INVENTION

Problems to be Solved by the Invention

Abrasion resistance evaluated on a water-repellent layer side exposed at a front surface side is required for a laminate having a water-repellent layer on a substrate in order to maintain good water-repellency. Therefore, an object of the present invention is to provide a laminate which has a substrate, an intermediate layer, and a water-repellent layer laminated in this order, and has excellent abrasion resistance.

Solution to the Problems

The present invention which has achieved the above problems is as follows.

[1] A laminate comprising:
  a substrate (s) having an anti-reflection layer;
  an intermediate layer (c) placed on the anti-reflection layer side of the substrate; and
  a water-repellent layer (r), in this order, wherein
  the intermediate layer (c) is a cured layer of a mixture composition (cc) of an organosilicon compound (C), or a vapor deposition layer of the organosilicon compound (C),
  the organosilicon compound (C) contains a silicon atom together with an amino group and/or an amine skeleton,
  the water-repellent layer (r) is a cured layer of a mixture composition (ca) of an organosilicon compound (A) in which a monovalent group having a perfluoropolyether structure is bound to a silicon atom through a linking group located therebetween or without a linking group located therebetween, and a hydrolyzable group is bound to the silicon atom through a linking group located therebetween or without a linking group located therebetween, and
  the laminate satisfies the following requirement (1),
  (1) a water sliding angle is not larger than 500 after a abrasion resistance test in which a 200 g load per 1.5 cm×1.5 cm area is applied to a surface on the water-repellent layer (r) side of the laminate and the surface is rubbed 20,000 times.

[2] The laminate according to [1], wherein the organosilicon compound (A) is at least one kind of organosilicon compounds represented by the following formula (a1),

[Chemical Formula 1]

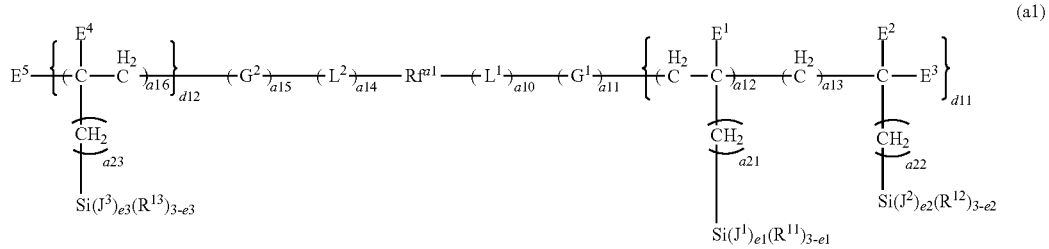

in the formula (a1),
  $Rf^{a1}$ represents a divalent perfluoropolyether structure having oxygen atoms at both ends,
  $R^{11}$, $R^{12}$, and $R^{13}$ each independently represent an alkyl group having 1 to 20 carbon atoms,
  when the number of $R^{11}$s is plural, the plurality of $R^{11}$s may be different from each other,
  when the number of $R^{12}$s is plural, the plurality of $R^{12}$s may be different from each other,
  when the number of $R^{13}$s is plural, the plurality of $R^{13}$s may be different from each other,
  $E^1$, $E^2$, $E^3$, $E^4$, and $E^5$ each independently represent a hydrogen atom or a fluorine atom,
  when the number of $E^1$s is plural, the plurality of $E^1$s may be different from each other, when the number of $E^2$s is plural, the plurality of $E^2$s may be different from each other, when the number of $E^3$s is plural, the plurality of $E^3$s may be different from each other, when the number of $E^4$s is plural, the plurality of $E^4$s may be different from each other, $G^1$ and $G^2$ each independently represent a 2 to 10 valent organosiloxane group having a siloxane bond, $J^1$, $J^2$, and $J^3$ each independently represent a hydrolyzable group or $-(CH_2)_{e6}-Si(OR^{14})_3$, e6 represents 1 to 5, $R^{14}$ represents a methyl group or an ethyl group, when the number of $J^1$s is plural, the plurality of $J^1$s may be different from each other, when the number of $J^2$s is plural, the plurality of $J^2$s may be different from each other, when the number of $J^3$s is plural, the plurality of $J^3$s may be different from each other, $L^1$ and $L^2$ each independently represent a divalent linking group that has 1 to 12 carbon atoms and may contain an oxygen atom, a nitrogen atom, or a fluorine atom, when the number of $L^1$s is plural, the plurality of $L^1$s may be different from each other, when the number of $L^2$s is plural, the plurality of $L^2$s may be different from each other, d11 represents 1 to 9, d12 represents 0 to 9, a10 and a14 each independently represent 0 to 10, a11 and a15 each independently represent 0 or 1, a12 and a16 each independently represent 0 to 9, a13 represents 0 or 1, a21, a22, and a23 each independently represent 0 to 2, and e1, e2, and e3 each independently represent 1 to 3.

[3] The laminate according to [1] or [2], wherein the mixture composition (ca) further contains at least one kind of organosilicon compounds (B) represented by the following formula (b1),

[Chemical Formula 2]

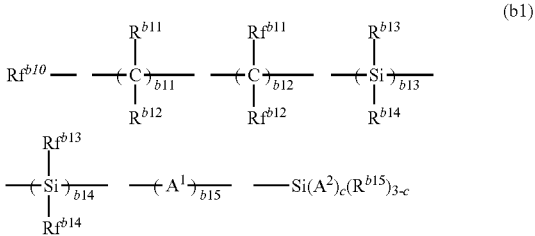

(b1)

in the formula (b1), $Rf^{b10}$ represents a fluorine atom, or an alkyl group having 1 to 20 carbon atoms in which one or more hydrogen atom is substituted by a fluorine atom, $R^{b11}$, $R^{b12}$, $R^{b13}$, and $R^{b14}$ each independently represent a hydrogen atom or an alkyl group having 1 to 4 carbon atoms, when the number of $R^{b11}$s is plural, the plurality of $R^{b11}$s may be different from each other, when the number of $R^{b12}$s is plural, the plurality of $R^{b12}$s may be different from each other, when the number of $R^{b13}$s is plural, the plurality of $R^{b13}$s may be different from each other, when the number of $R^{b14}$s is plural, the plurality of $R^{b14}$s may be different from each other, $Rf^{b11}$, $Rf^{b12}$, $Rf^{b13}$, and $Rf^{b14}$ each independently represent a fluorine atom, or an alkyl group having 1 to 20 carbon atoms in which one or more hydrogen atom is substituted by a fluorine atom, when the number of $Rf^{b11}$s is plural, the plurality of $Rf^{b11}$s may be different from each other, when the number of $Rf^{b12}$s is plural, the plurality of $Rf^{b12}$s may be different from each other, when the number of $Rf^{b13}$s is plural, the plurality of $Rf^{b13}$s may be different from each other, when the number of $Rf^{b14}$s is plural, the plurality of $Rf^{b14}$s may be different from each other, $R^{b15}$ represents an alkyl group having 1 to 20 carbon atoms, when the number of $R^{b15}$s is plural, the plurality of $R^{b15}$s may be different from each other, $A^1$ represents $-O-$, $-C(=O)-O-$, $-O-C(=O)-$, $-NR-$, $-NRC(=O)-$, or $-C(=O)NR-$, R represents a hydrogen atom, an alkyl group having 1 to 4 carbon atoms, or a fluorine-containing alkyl group having 1 to 4 carbon atoms, when the number of $A^1$s is plural, the plurality of $A^1$s may be different from each other, $A^2$ represents a hydrolyzable group, when the number of $A^2$s is plural, the plurality of $A^2$s may be different from each other, b11, b12, b13, b14, and b15 each independently represent an integer of 0 to 100, c represents an integer of 1 to 3, and $Rf^{b10}-$; $-Si(A^2)_c(R^{b15})_{3-c}$; $-\{C(R^{b11})(R^{b12})\}-$ whose number is b11; $-\{C(Rf^{b11})(Rf^{b12})\}-$ whose number is b12; $-\{Si(R^{b13})(R^{b14})\}-$ whose number is b13; $-\{Si(Rf^{b13})(Rf^{b14})\}-$ whose number is b14; and $-A^1-$ whose number is b15 are aligned and bound in any order as long as $Rf^{b10}-$ and $-Si(A^2)_c(R^{b15})_{3-c}$ are located at ends, no perfluoropolyether structure is formed, and $-O-$ does not link to $-O-$ and $-F$.

[4] The laminate according to [3], wherein, in the mixture composition (ca), a mass ratio of the organosilicon compound (B) to the organosilicon compound (A) is 0.05 to 2.0.

[5] The laminate according to any one of [1] to [4], wherein a hydrolyzable group or a hydroxy group is bound to at least one silicon atom in the organosilicon compound (C).

[6] The laminate according to any one of [1] to [5], wherein the organosilicon compound (C) is an organosilicon compound represented by any of the following formulas (c1) to (c3),

[Chemical Formula 3]

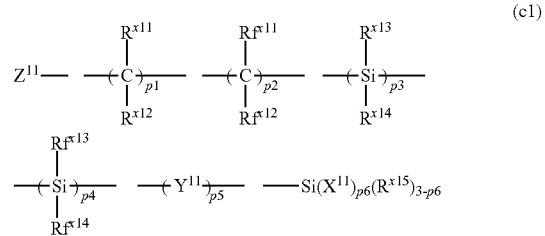

(c1)

in the formula (c1), $R^{x11}$, $R^{x12}$, $R^{x13}$, and $R^{x14}$ each independently represent a hydrogen atom or an alkyl group having 1 to 4 carbon atoms, when the number of $R^{x11}$s is plural, the plurality of $R^{x11}$s may be different from each other, when the number of $R^{x12}$s is plural, the plurality of $R^{x12}$s may be different from each other, when the number of $R^{x13}$s is plural, the plurality of $R^{x13}$s may be different from each other, when the number of $R^{x14}$s is plural, the plurality of $R^{x14}$s may be different from each other, $Rf^{x11}$, $Rf^{x12}$, $Rf^{x13}$, and $Rf^{x14}$ each independently represent a fluorine atom, or an alkyl group having 1 to 20 carbon atoms in which one or more hydrogen atom is substituted by a fluorine atom, when the number of $Rf^{x11}$s is plural, the plurality of $Rf^{x11}$s may be different from each other, when the number of $Rf^{x12}$s is plural, the plurality of $Rf^{x12}$s may be different from each other, when the number of $Rf^{x13}$s is plural, the plurality of $Rf^{x13}$s may be different from each other, when the number of $Rf^{x14}$s is plural, the plurality of $Rf^{x14}$s may be different from each other, $R^{x15}$ represents an alkyl group having 1 to 20 carbon atoms, when the number of $R^{x15}$s is plural, the plurality of $R^{x15}$s may be different from each other, $X^{11}$ represents a hydrolyzable group, when the number of $X^{11}$s is plural, the plurality of $X^{11}$s may be different from each other, $Y^{11}$ represents —NH— or —S—, when the number of $Y^{11}$s is plural, the plurality of $Y^{11}$s may be different from each other, $Z^{11}$ represents a vinyl group, an α-methylvinyl group, a styryl group, a methacryloyl group, an acryloyl group, an amino group, an isocyanate group, an isocyanurate group, an epoxy group, a ureido group, or a mercapto group, p1 represents an integer of 1 to 20, p2, p3, and p4 each independently represent an integer of 0 to 10, p5 represents an integer of 1 to 10, p6 represents an integer of 1 to 3, when $Z^{11}$ does not represent an amino group, at least one of $Y^{11}$s represents —NH—, when all of $Y^{11}$s represent —S—, $Z^{11}$ represents an amino group, and $Z^{11}$—; —Si($X^{11}$)$_{p6}$($R^{x15}$)$_{3-p6}$; —{C($R^{x11}$)($R^{x12}$)}— whose number is p1; —{C($Rf^{x11}$)($Rf^{x12}$)}— whose number is p2; —{Si($R^{x13}$)($R^{x14}$)}— whose number is p3; —{Si($Rf^{x13}$)($Rf^{x14}$)}— whose number is p4; and —$Y^{11}$— whose number is p5 are aligned and bound in any order as long as $Z^{11}$— and —Si($X^{11}$)$_{p6}$($R^{x15}$)$_{3-p6}$ are located at ends and —O— does not link to —O—,

[Chemical Formula 4]

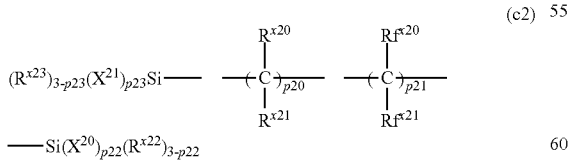

(c2)

in the formula (c2), $R^{x20}$ and $R^{x21}$ each independently represent a hydrogen atom or an alkyl group having 1 to 4 carbon atoms, when the number of $R^{x20}$s is plural, the plurality of $R^{x20}$s may be different from each other, when the number of $R^{x21}$s is plural, the plurality of $R^{x21}$s may be different from each other, $Rf^{x20}$ and $Rf^{x21}$ each independently represent a fluorine atom, or an alkyl group having 1 to 20 carbon atoms in which one or more hydrogen atom is substituted by a fluorine atom, when the number of $Rf^{x20}$s is plural, the plurality of $Rf^{x20}$s may be different from each other, when the number of $Rf^{x21}$s is plural, the plurality of $Rf^{x21}$s may be different from each other, $R^{x22}$ and $R^{x23}$ each independently represent an alkyl group having 1 to 20 carbon atoms, when the numbers of $R^{x22}$s and $R^{x23}$s are plural, the plurality of $R^{x22}$s and the plurality of $R^{x23}$s may be different from each other, $X^{20}$ and $X^{21}$ each independently represent a hydrolyzable group, when the numbers of $X^{20}$s and $X^{21}$s are plural, the plurality of $X^{20}$s and the plurality of $X^{21}$s may be different from each other, p20 represents an integer of 1 to 30, p21 represents an integer of 0 to 30, at least one of repeating units bracketed with p20 or p21 is replaced by an amine skeleton —$NR^{100}$—, $R^{100}$ in the amine skeleton represents a hydrogen atom or an alkyl group, p22 and p23 each independently represent an integer of 1 to 3, and —{C($R^{x20}$)($R^{x21}$)}— whose number is p20 and —{C($Rf^{x20}$)($Rf^{x21}$)}— whose number is p21 are aligned and bound in any order, p20 or p21 units may not necessarily be continuous, and both ends are —Si($X^{20}$)$_{p22}$($R^{x22}$)$_{3-p22}$ and —Si($X^{21}$)$_{p23}$($R^{x23}$)$_{3-p23}$,

[Chemical Formula 5]

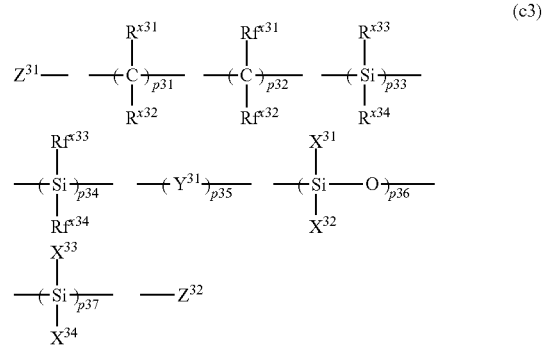

(c3)

in the formula (c3), $Z^{31}$ and $Z^{32}$ each independently represent a reactive functional group other than a hydrolyzable group and a hydroxy group, $R^{x31}$, $R^{x32}$, $R^{x33}$, and $R^{x34}$ each independently represent a hydrogen atom or an alkyl group having 1 to 4 carbon atoms, when the number of $R^{x31}$s is plural, the plurality of $R^{x31}$s may be different from each other, when the number of $R^{x32}$s is plural, the plurality of $R^{x32}$s may be different from each other, when the number of $R^{x33}$s is plural, the plurality of $R^{x33}$s may be different from each other, when the number of $R^{x34}$s is plural, the plurality of $R^{x34}$s may be different from each other, $Rf^{x31}$, $Rf^{x32}$, $Rf^{x33}$, and $Rf^{x34}$ each independently represent a fluorine atom, or an alkyl group having 1 to 20 carbon atoms in which one or more hydrogen atom is substituted by a fluorine atom, when the number of $Rf^{x31}$s is plural, the plurality of $Rf^{x31}$s may be different from each other, when the number of $Rf^{x32}$s is plural, the plurality of $Rf^{x32}$s may be different from each other, when the number of $Rf^{x33}$s is plural, the plurality of $Rf^{x33}$s may be different from each other, when the number of $Rf^{x34}$s is plural, the plurality of $Rf^{x34}$s may be different from each other, $Y^{31}$ represents —NH—, —N(CH$_3$)—, or —O—, when the number of $Y^{31}$s is plural, the plurality of $Y^{31}$s may be different from each other, $X^{31}$, $X^{32}$, $X^{33}$, and $X^{34}$ each independently represent —OR$^c$ (R$^c$ represents a hydrogen atom, an alkyl group having 1 to 4 carbon atoms, or an aminoC$_{1-3}$alkyl diC$_{1-3}$alkoxysilyl group), when the number of $X^{31}$s is plural, the plurality of $X^{31}$s may be different from each other, when the number of $X^{32}$s is plural, the plurality of $X^{32}$s may be different from each other, when the number of $X^{33}$s is plural, the plurality of $X^{33}$s may be different from each other, when the number of $X^{34}$s is plural, the plurality of $X^{34}$s may be different from each other, p31 represents an integer of 0 to 20, p32, p33, and p34 each independently represent an integer of 0 to 10, p35 represents an integer of 0 to 5, p36 represents an integer of 1 to 10, p37 represents 0 or 1, and —{C(R$^{x31}$)(R$^{x32}$)}— whose number is p31; —{C(Rf$^{x31}$)(Rf$^{x32}$)}— whose number is p32; —{Si(R$^{x33}$)(R$^{x34}$)}— whose number is p33; —{Si(Rf$^{x33}$)(Rf$^{x34}$)}— whose number is p34; —Y$^{31}$— whose number is p35; —{Si(X$^{31}$)(X$^{32}$)—O}— whose number is p36; and —{Si(X$^{33}$)(X$^{34}$)}— whose number is p37 are aligned and bound in any order, as long as a condition that at least one of $Z^{31}$ and $Z^{32}$ represents an amino group or at least one of $Y^{31}$s represents —NH— or —N(CH$_3$)— is satisfied, ends are $Z^{31}$— and $Z^{32}$—, and —O— does not link to —O—.

[7] The laminate according to any one of [1] to [6], wherein the organosilicon compound (A) is a compound represented by the following formula (a3) or (a4), and the organosilicon compound (C) is a compound represented by the following formula (c1-2) or (c2-2),

[Chemical Formula 6]

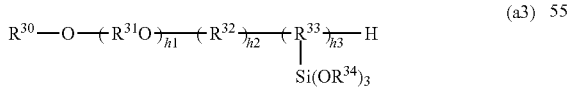
(a3)

in the formula (a3), $R^{30}$ represents a perfluoroalkyl group having 2 to 6 carbon atoms, $R^{31}$ and $R^{32}$ each independently represent a perfluoroalkylene group having 2 to 6 carbon atoms, $R^{33}$ represents a trivalent saturated hydrocarbon group having 2 to 6 carbon atoms, and $R^{34}$ represents an alkyl group having 1 to 3 carbon atoms,

[Chemical Formula 7]

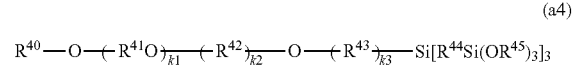
(a4)

in the formula (a4), $R^{40}$ represents a perfluoroalkyl group having 2 to 5 carbon atoms, $R^{41}$ represents a perfluoroalkylene group having 2 to 5 carbon atoms, $R^{42}$ represents a fluoroalkylene group in which a part of hydrogen atoms of an alkylene group having 2 to 5 carbon atoms is substituted by fluorine, $R^{43}$ and $R^{44}$ each independently represent an alkylene group having 2 to 5 carbon atoms, $R^{45}$ represents a methyl group or an ethyl group, and k1, k2, and k3 each independently represent an integer of 1 to 5,

[Chemical Formula 8]

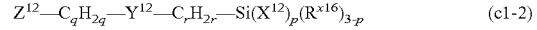
(c1-2)

in the formula (c1-2), $X^{12}$ represents a hydrolyzable group, when the number of $X^{12}$s is plural, the plurality of $X^{12}$s may be different from each other, $Y^{12}$ represents —NH—, $Z^{12}$ represents an amino group or a mercapto group, $R^{x16}$ represents an alkyl group having 1 to 20 carbon atoms, when the number of $R^{x16}$s is plural, the plurality of $R^{x16}$s may be different from each other, p represents an integer of 1 to 3, q represents an integer of 2 to 5, and r represents an integer of 0 to 5,

[Chemical Formula 9]

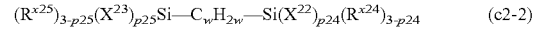
(c2-2)

in the formula (c2-2), $X^{22}$ and $X^{23}$ each independently represent a hydrolyzable group, when the numbers of $X^{22}$s and $X^{23}$s are plural, the plurality of $X^{22}$s and the plurality of $X^{23}$s may be different from each other, $R^{x24}$ and $R^{x25}$ each independently represent an alkyl group having 1 to 20 carbon atoms, when the numbers of $R^{x24}$s and $R^{x25}$s are plural, the plurality of $R^{x24}$s and the plurality of $R^{x25}$s may be different from each other, at least one methylene group in a part of —C$_w$H$_{2w}$— is replaced by an amine skeleton —NR$^{100}$—, $R^{100}$ represents a hydrogen atom or an alkyl group, w represents an integer of 1 to 30 (excluding the number of methylene group replaced by the amine skeleton), and p24 and p25 each independently represent an integer of 1 to 3.

[8] The laminate according to any one of [1] to [7], wherein a property measured on a surface on the water-repellent layer side further satisfies at least one of the following requirements (1') and (3), (1') a water contact angle after the abrasion resistance test is not less than 90°, and (3) an initial water sliding angle is not larger than 21°.

[9] The laminate according to any one of [1] to [8], wherein the property measured on the surface on the water-repellent layer side further satisfies the following requirement (4),
  (4) a coefficient of kinetic friction after the abrasion resistance test is not larger than 0.40.
[10] The laminate according to any one of [1] to [9], wherein an F amount is not less than 5 atom % and an N amount is not less than 0.15 atom % on a surface of the laminate on the water-repellent layer (r) side in XPS measurement of the surface.
[11] The laminate according to any one of [1] to [10], wherein a ratio (absolute value of Sa(c)/absolute value of Sa(s)) of an absolute value of an arithmetic average height Sa(c) of the intermediate layer (c) before the water-repellent layer (r) is laminated, relative to an absolute value of an arithmetic average height Sa(s) of the substrate (s) before the intermediate layer (c) is laminated, is less than 100%.
[12] The laminate according to any one of [1] to [11], wherein the substrate (s) is a glass layer or a resin layer on which the anti-reflection layer is formed.
[13] A spectacle lens comprising the laminate according to any one of [1] to [12].
[14] A production method for producing a laminate comprising a substrate (s) having an anti-reflection layer, an intermediate layer (c) placed on the anti-reflection layer side of the substrate, and a water-repellent layer (r), in this order, the production method comprising:
  applying a mixture composition (cc) of an organosilicon compound (C) represented by any of the above formulas (c1) to (c3) to an anti-reflection layer surface of the substrate (s) having the anti-reflection layer,
  applying a mixture composition (ca) of an organosilicon compound (A) represented by the above formula (a1) to the surface to which the mixture composition (cc) has been applied, and
  curing the mixture composition (cc) and the mixture composition (ca), to form the intermediate layer (c) from an applied layer of the mixture composition (cc), and form the water-repellent layer (r) from an applied layer of the mixture composition (ca).
[15] A production method for producing a laminate comprising a substrate (s) having an anti-reflection layer, an intermediate layer (c) placed on the anti-reflection layer side of the substrate, and a water-repellent layer (r) in this order, the production method comprising:
  vapor-depositing an organosilicon compound (C) represented by any of the above formulas (c1) to (c3) on an anti-reflection layer surface of the substrate (s) having the anti-reflection layer to form the intermediate layer (c), and
  applying and curing a mixture composition (ca) of an organosilicon compound (A) represented by the above formula (a1) onto the intermediate layer (c) to form the water-repellent layer (r) from an applied layer of the mixture composition (ca).
[16] The production method for producing the laminate according to [14] or [15], comprising:
  subjecting the anti-reflection layer of the substrate (s) to hydrophilization treatment before the mixture composition (cc) is applied or before the organosilicon compound (C) is vapor-deposited, and
  applying the mixture composition (cc) to or vapor-depositing the organosilicon compound (C) on a surface subjected to the hydrophilization treatment.

Advantageous Effects of the Invention

The laminate of the present invention in which the substrate (s) having the anti-reflection layer, the intermediate layer (c) placed on the anti-reflection layer side of the substrate, and the water-repellent layer (r) are disposed in this order, has excellent abrasion resistance.

DESCRIPTION OF EMBODIMENTS

A laminate of the present invention is a laminate comprising:
  a substrate (s) having an anti-reflection layer;
  an intermediate layer (c) placed on the anti-reflection layer side of the substrate; and
  a water-repellent layer (r), in this order, wherein
  the intermediate layer (c) is a cured layer of a mixture composition (cc) of an organosilicon compound (C), or a vapor deposition layer of the organosilicon compound (C),
  the organosilicon compound (C) contains a silicon atom together with an amino group and/or an amine skeleton,
  the water-repellent layer (r) is a cured layer of a mixture composition (ca) of an organosilicon compound (A) in which a monovalent group having a perfluoropolyether structure is bound to a silicon atom through a linking group or without a linking group located therebetween, and a hydrolyzable group is bound to the silicon atom through a linking group or without a linking group located therebetween, and
  the laminate satisfies the following requirement (1),
  (1) a water sliding angle is not larger than 50° after a abrasion resistance test in which a 200 g load per 1.5 cm×1.5 cm area is applied to a surface on the water-repellent layer (r) side of the laminate and the surface is rubbed 20,000 times.

The laminate of the present invention which satisfies the above requirements can exhibit good abrasion resistance.

In the requirement (1), the water sliding angle is preferably not larger than 40°, more preferably not larger than 30°, and even more preferably not larger than 20°, and, furthermore, still more preferably not larger than 10°. Furthermore, the sliding angle may be not less than 1°.

The abrasion resistance test is performed such that a load of 200 g per 1.5 cm×1.5 cm area is applied to a surface on the water-repellent layer (r) side of the laminate and the surface is rubbed 20,000 times. The surface is preferably rubbed by paper made of a pulp material and more preferably by paper which is made of a pulp material and attached to an elastic body. As the paper made of a pulp material, KIMWIPe S-200 manufactured by NIPPON PAPER CRECIA CO., LTD. is preferably used. For example, preferably, the abrasion resistance test is performed at a stroke distance of 30 mm and a rubbing speed of 70 to 90 reciprocations/minute by using the KIMWIPe S-200, and the sliding angle is measured at almost the center of a stroke region. When the load is applied, the load may be a pressure equivalent to application of a load of 200 g per 1.5 cm×1.5 cm area. The laminate that has the water-repellent layer (r) having the size of less than 1.5 cm×1.5 cm is also included in the scope of the present invention.

Preferably, the laminate of the present invention also satisfies the following requirement (2).
  (2) When measured on the surface on the water-repellent layer (r) side, (2-i) a reflectance obtained by subtracting a front surface reflection loss and a back surface reflection loss from a spectral reflectance at a wavelength of 530 nm at an angle of incidence of 12° and an angle of reflection of 12°, calculated at 2-degree visual field (illuminant C) in JIS Z8701, is not larger than 5.0%, or (2-ii) a reflectance at a wavelength of 530 nm, obtained by conversion with illuminant D65 and 10-degree visual field, with use of an illuminant of halogen lamp and an objective lens of 10-fold magnification, is not larger than 5.0%.

In the requirement (2), the reflectance (including both the reflectances specified by the above-described (2-i) and (2-ii)) is preferably not larger than 4.0%, more preferably not larger than 3.5%, even more preferably not larger than 3.0%, and, furthermore, still more preferably not larger than 2.5%. The reflectance may be, for example, not less than 1.0%.

Furthermore, the laminate of the present invention preferably satisfies at least one of the requirements (1'), (3), and (4) described below, more preferably satisfies (1') and (3), and even more preferably satisfies (1'), (3), and (4), when measured on the surface on the water-repellent layer side.

(1') A water contact angle is not less than 90° after the abrasion resistance test.

The water contact angle after the abrasion resistance test is more preferably not less than 95°, even more preferably not less than 100°, and, furthermore, still more preferably not less than 110°. The water contact angle may be, for example, not larger than 130°.

(3) An initial water sliding angle is not larger than 21°.

The initial water sliding angle in the requirement (3) represents a water sliding angle measured before the above-described abrasion resistance test is performed. The initial water sliding angle is more preferably not larger than 20°, even more preferably not larger than 15°, and, furthermore, still more preferably not larger than 10°. The initial water sliding angle may be not less than 0.5°.

(4) A coefficient of kinetic friction is not larger than 0.40 after the abrasion resistance test.

The coefficient of kinetic friction after the abrasion resistance test is more preferably not larger than 0.35, even more preferably not larger than 0.30, and, furthermore, still more preferably not larger than 0.25. The coefficient of kinetic friction may be not less than 0.10.

An initial coefficient of kinetic friction (that is, before the abrasion resistance test) is preferably not larger than 0.35, more preferably not larger than 0.30, and even more preferably not larger than 0.25, and may be not less than 0.10.

An F amount of the surface is preferably not less than 5 atom % and an N amount thereof is preferably not less than 0.15 atom % in XPS measurement on the surface on the water-repellent layer (r) side of the laminate. When the requirements are satisfied, at least one of the initial water-repellency, the initial water sliding properties, and abrasion resistance (the water-repellency, the water sliding properties, and reduction of the coefficient of kinetic friction after abrasion resistance test) can be excellent on the surface on the water-repellent layer (r) side. The F amount is more preferably not less than 10 atom % and even more preferably not less than 25 atom %, and, furthermore, still more preferably not less than 40 atom %, and may be not larger than 70 atom %. The N amount is more preferably not less than 0.5 atom % and even more preferably not less than 1.0 atom %, and, furthermore, still more preferably not less than 2.0 atom %, and may be not larger than 10 atom %.

The substrate (s) having an anti-reflection layer, the intermediate layer (c), and the water-repellent layer (r) in the laminate of the present invention will be sequentially described below.

1. Substrate (s)

A material of a portion other than an anti-reflection layer (ar) in the substrate (s) is not particularly limited, and may be an organic material or an inorganic material, as long as the substrate (s) has the anti-reflection layer (ar) on at least one surface. Examples of the organic material include thermoplastic resins such as acrylic resin, polycarbonate resin, polyester resin, styrene resin, acryl-styrene copolymer resin, cellulose resin, polyolefin resin, and vinyl-based resin (polyethylene, polyvinyl chloride, polystyrene, vinylbenzyl chloride-based resin, polyvinyl alcohol, and the like), and thermosetting resins such as phenol resin, urea resin, melamine resin, epoxy resin, unsaturated polyester, silicone resin, and urethane resin. Examples of the inorganic material include metals such as iron, silicon, copper, zinc, and aluminum, and an alloy containing such a metal, ceramics, and glass.

The laminate of the present invention can be preferably used for, for example, a spectacle lens. In this case, the substrate (s) is preferably glass layer (sg) or a resin layer (sp) on which the anti-reflection layer (ar) is formed. The anti-reflection layer (ar) is preferably formed at least on the intermediate layer (c) side. For the resin layer (sp), allyl diglycol carbonate resin, polycarbonate resin, thiourethane resin, episulfide resin, or the like can be used. A primer layer and/or a hard coat layer may be formed between the anti-reflection layer (ar), and the glass layer (sg) or the resin layer (sp).

The primer layer enhances adhesiveness of two laminated layers between which the primer layer is placed, and a known material can be used for the primer layer.

The hard coat layer imparts scratch resistance to the glass layer (sp) or the resin layer (sg), and indicates a hardness not less than H of a pencil hardness according to a test method defined in JIS K5600. As the hard coat layer, a known hard coat layer can be used, and examples of the hard coat layer include organic hard coat layers, inorganic hard coat layers, and organic-inorganic hybrid hard coat layers.

The anti-reflection layer (ar) functions to prevent incident light from being reflected, and the anti-reflection layer (ar) exhibits reflection characteristics in which a reflectance is reduced to be about not larger than 5.0% in a 530 nm visible light region. The reflectance of the anti-reflection layer (ar) can also be measured via the (2-i) or (2-ii) method as described above for the reflectance measured on the surface on the water-repellent layer (r) side. The structure of the anti-reflection layer (ar) is not particularly limited, and may be a monolayer structure or multilayer structure. In the case of the multilayer structure, preferably, low refractive index layers and high refractive index layers are alternately laminated. Examples of a material of the high refractive index layer include oxides of titanium, zirconium, aluminum, tantalum, and lanthanum. Examples of a material of the low refractive index layer include silica. The anti-reflection layer (ar) having a multilayer structure is preferably structured such that $SiO_2$ and $ZrO_2$ are alternately laminated, and the outermost layer on the side opposite to the glass layer (sg) or the resin layer (sp) side is $SiO_2$. The anti-reflection layer (ar) can be formed by, for example, a vapor deposition method.

A thickness of the substrate (s) is, for example, 0.9 to 10 mm. When the thickness of the substrate (s) is not uniform, it is preferable that the thickness of the substrate (s) at the centroid is in the above-described range.

2. Intermediate Layer (c)

The intermediate layer (c) is a cured layer of a mixture composition (cc) of an organosilicon compound (C) or a vapor deposition layer of the organosilicon compound (C), the organosilicon compound (C) contains a silicon atom together with an amino group or an amine skeleton ($-NR^{100}-$, and $R^{100}$ represents a hydrogen atom or an alkyl group), and the intermediate layer (c) has an amino group or an amine skeleton. In a preferable mode, a hydrolyzable group or a hydroxy group is bound to a silicon atom in the organosilicon compound (C), and Si—OH groups of the organosilicon compound (C) or —SiOH groups of the organosilicon compound (C) generated by hydrolysis of the hydrolyzable group bound to the silicon atom are dehydration-condensed, and, therefore, the intermediate layer (c) preferably has a condensed structure derived from the organosilicon compound (C). The intermediate layer (c) can function as a primer layer of the water-repellent layer (r). Examples of the hydrolyzable group bound to a silicon atom of the organosilicon compound (C) include an alkoxy group, a halogen atom, a cyano group, an acetoxy group, and an isocyanate group. An alkoxy group having 1 to 4 carbon atoms or a hydroxy group is preferably bound to a silicon atom of the organosilicon compound (C).

2-1. Organosilicon Compound (C) Represented by the Formula (c1) (Hereinafter, Referred to as Organosilicon Compound (C1))

[Chemical Formula 10]

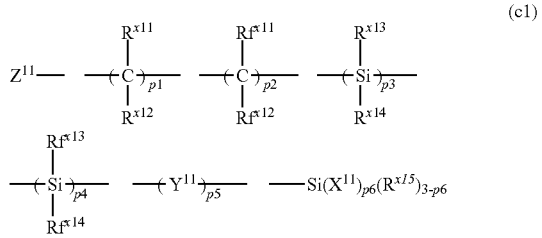

(c1)

in the formula (c1), $R^{x11}$, $R^{x12}$, $R^{x13}$, and $R^{x14}$ each independently represent a hydrogen atom or an alkyl group having 1 to 4 carbon atoms, when the number of $R^{x11}$s is plural, the plurality of $R^{x11}$s may be different from each other, when the number of $R^{x12}$s is plural, the plurality of $R^{x12}$s may be different from each other, when the number of $R^{x13}$s is plural, the plurality of $R^{x13}$s may be different from each other, when the number of $R^{x14}$s is plural, the plurality of $R^{x14}$s may be different from each other, $Rf^{x11}$, $Rf^{x12}$, $Rf^{x13}$, and $Rf^{x14}$ each independently represent a fluorine atom, or an alkyl group having 1 to 20 carbon atoms in which one or more hydrogen atom is substituted by a fluorine atom, when the number of $Rf^{x11}$s is plural, the plurality of $Rf^{x11}$s may be different from each other, when the number of $Rf^{x12}$s is plural, the plurality of $Rf^{x12}$s may be different from each other, when the number of $Rf^{x13}$s is plural, the plurality of $Rf^{x13}$s may be different from each other, when the number of $Rf^{x14}$s is plural, the plurality of $Rf^{x14}$s may be different from each other, $R^{x15}$ represents an alkyl group having 1 to 20 carbon atoms, when the number of $R^{x15}$s is plural, the plurality of $R^{x15}$s may be different from each other, $X^{11}$ represents a hydrolyzable group, when the number of $X^{11}$s is plural, the plurality of $X^{11}$s may be different from each other, $Y^{11}$ represents —NH— or —S—, when the number of $Y^{11}$s is plural, the plurality of $Y^{11}$s may be different from each other, $Z^{11}$ represents a vinyl group, an α-methylvinyl group, a styryl group, a methacryloyl group, an acryloyl group, an amino group, an isocyanate group, an isocyanurate group, an epoxy group, a ureido group, or a mercapto group, p1 represents an integer of 1 to 20, p2, p3, and p4 each independently represent an integer of 0 to 10, p5 represents an integer of 1 to 10, p6 represents an integer of 1 to 3, when $Z^{11}$ does not represent an amino group, at least one of $Y^{11}$s represents —NH—, when all of $Y^{11}$s represent —S—, $Z^{11}$ represents an amino group, and $Z^{11}$—; —$Si(X^{11})_{p6}(R^{x15})_{3-p6}$; —{$C(R^{x11})(R^{x12})$}— whose number is p1; —{$C(Rf^{x11})(Rf^{x12})$}— whose number is p2; —{$Si(R^{x13})(R^{x14})$}— whose number is p3; —{$Si(Rf^{x13})(Rf^{x14})$}— whose number is p4; and —$Y^{11}$— whose number is p5 are aligned and bound in any order as long as $Z^{11}$— and —$Si(X^{11})_{p6}(R^{x15})_{3-p6}$ are located at ends and —O— does not link to —O—, $R^{x11}$, $R^{x12}$, $R^{x13}$, and $R^{x14}$ preferably represent a hydrogen atom.

Preferably, $Rf^{x11}$, $Rf^{x12}$, $Rf^{x13}$, and $Rf^{x14}$ each independently represent a fluorine atom, or an alkyl group having 1 to 10 carbon atoms in which one or more hydrogen atom is substituted by a fluorine atom.

$R^{x15}$ preferably represents an alkyl group having 1 to 5 carbon atoms.

$X^{11}$ preferably represents an alkoxy group, a halogen atom, a cyano group, or an isocyanate group, more preferably represents an alkoxy group, and even more preferably represents a methoxy group or an ethoxy group.

$Y^{11}$ preferably represents —NH—.

$Z^{11}$ preferably represents a methacryloyl group, an acryloyl group, a mercapto group, or an amino group, more preferably represents a mercapto group or an amino group, and even more preferably represents an amino group.

p1 preferably represents 1 to 15 and more preferably represents 2 to 10. Preferably, p2, p3, and p4 each independently represent 0 to 5, and, more preferably, all of p2, p3, and p4 represent 0 to 2. p5 preferably represents 1 to 5 and more preferably represents 1 to 3. p6 preferably represents 2 to 3 and more preferably represents 3.

The organosilicon compound (C) is preferably a compound in which, in the formula (c1), $R^{x11}$ and $R^{x12}$ each represent a hydrogen atom, $Y^{11}$ represents —NH—, $X^{11}$ represents an alkoxy group (in particular, a methoxy group or an ethoxy group), $Z^{11}$ represents an amino group or a mercapto group, p1 represents 1 to 10, each of p2, p3, and p4 represents 0, p5 represents 1 to 5 (in particular, 1 to 3), and p6 represents 3.

The organosilicon compound (C1) is preferably represented by the following formula (c1-2).

[Chemical Formula 11]

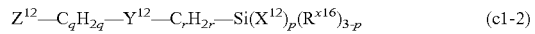

(c1-2)

in the formula (c1-2), $X^{12}$ represents a hydrolyzable group, when the number of $X^{12}$s is plural, the plurality of $X^{12}$s may be different from each other, $Y^{12}$ represents —NH—, $Z^{12}$ represents an amino group or a mercapto group, $R^{x16}$ represents an alkyl group having 1 to 20 carbon atoms, when the number of $R^{x11}$s is plural, the plurality of $R^{x11}$s may be different from each other, p represents an integer of 1 to 3, q represents an integer of 2 to 5, and r represents an integer of 0 to 5.

$X^{12}$ preferably represents an alkoxy group, a halogen atom, a cyano group, or an isocyanate group, and more preferably represents an alkoxy group.

$Z^{12}$ preferably represents an amino group.

$R^{x16}$ preferably represents an alkyl group having 1 to 10 carbon atoms, and more preferably represents an alkyl group having 1 to 5 carbon atoms.

p preferably represents an integer of 2 to 3 and more preferably represents 3.

q preferably represents an integer of 2 to 3. r preferably represents an integer of 2 to 4.

2-2. Organosilicon Compound (C) Represented by the Formula (c2) (Hereinafter, Referred to as Organosilicon Compound (C2))

[Chemical Formula 12]

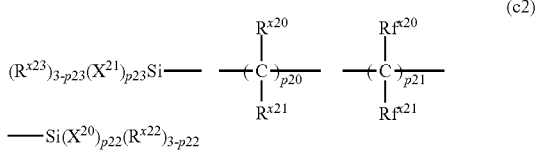

in the formula (c2), $R^{x20}$ and $R^{x21}$ each independently represent a hydrogen atom or an alkyl group having 1 to 4 carbon atoms, when the number of $R^{x20}$s is plural, the plurality of $R^{x20}$s may be different from each other, when the number of $R^{x21}$s is plural, the plurality of $R^{x21}$s may be different from each other, $Rf^{x20}$ and $Rf^{x21}$ each independently represent a fluorine atom, or an alkyl group having 1 to 20 carbon atoms in which one or more hydrogen atom is substituted by a fluorine atom, when the number of $Rf^{x20}$s is plural, the plurality of $Rf^{x20}$s may be different from each other, when the number of $Rf^{x21}$s is plural, the plurality of $Rf^{x21}$s may be different from each other, $R^{x22}$ and $R^{x23}$ each independently represent an alkyl group having 1 to 20 carbon atoms, when the numbers of $R^{x22}$s and $R^{x23}$s are plural, the plurality of $R^{x22}$s and the plurality of $R^{x23}$s may be different from each other, $X^{20}$ and $X^{21}$ each independently represent a hydrolyzable group, when the numbers of $X^{20}$s and $X^{21}$s are plural, the plurality of $X^{20}$s and the plurality of $X^{21}$s may be different from each other, p20 represents an integer of 1 to 30, p21 represents an integer of 0 to 30, at least one of repeating units bracketed with p20 or p21 is replaced by an amine skeleton —$NR^{100}$—, $R^{100}$ in the amine skeleton represents a hydrogen atom or an alkyl group, p22 and p23 each independently represent an integer of 1 to 3, and —{$C(R^{x20})(R^{x21})$}— whose number is p20 and —{$C(Rf^{x20})(Rf^{x21})$}— whose number is p21 are aligned and bound in any order, p20 or p21 units may not necessarily be continuous, and both ends are —$Si(X^{20})_{p22}(R^{x22})_{3-p22}$ and —$Si(X^{21})_{p23}(R^{x23})_{3-p23}$.

Preferably, $R^{x20}$ and $R^{x21}$ each represent a hydrogen atom.

Preferably, $Rf^{x20}$ and $Rf^{x21}$ each independently represent a fluorine atom, or an alkyl group having 1 to 10 carbon atoms in which one or more hydrogen atom is substituted by a fluorine atom.

Preferably, $R^{x22}$ and $R^{x23}$ each represent an alkyl group having 1 to 5 carbon atoms.

Each of $X^{20}$ and $X^{21}$ preferably represents an alkoxy group, a halogen atom, a cyano group, or an isocyanate group, more preferably represents an alkoxy group, and even more preferably represents a methoxy group or an ethoxy group.

The number of the amine skeletons —$NR^{100}$— may be at least one in the molecule as described above. It is sufficient that any of the repeating units bracketed with p20 or p21 is replaced by the amine skeleton, but a part of the repeating unit bracketed with p20 is preferably replaced. The number of the amine skeletons may be plural. In this case, the number of the amine skeletons is preferably 1 to 10, more preferably 1 to 5, and even more preferably 2 to 5. Furthermore, in this case, an alkylene group is preferably located between the amine skeletons adjacent to each other, and the number of carbon atoms in the alkylene group is preferably 1 to 10 and more preferably 1 to 5. The number of the carbon atoms in the alkylene group between the amine skeletons adjacent to each other is included in the total number of p20 or p21.

When $R^{100}$ represents an alkyl group in the amine skeleton —$NR^{100}$—, the number of carbon atoms is preferably not larger than 5 and more preferably not larger than 3. The amine skeleton —$NR^{100}$— is preferably —NH— ($R^{100}$ represents a hydrogen atom).

p20 preferably represents 1 to 15 and more preferably represents 1 to 10 excluding the number of the repeating units replaced by the amine skeletons.

p21 preferably represents 0 to 5, and, more preferably represents 0 to 2, excluding the number of the repeating units replaced by the amine skeletons.

Each of p22 and p23 preferably represents 2 to 3 and more preferably represents 3.

The organosilicon compound (C2) is preferably a compound in which, in the formula (c2), $R^{x20}$ and $R^{x21}$ each represent a hydrogen atom, $X^{20}$ and $X^{21}$ each represent an alkoxy group (in particular, a methoxy group or an ethoxy group), at least one of the repeating units bracketed with p20 is replaced by the amine skeleton —$NR^{100}$—, $R^{100}$ represents a hydrogen atom, p20 represents 1 to 10 (excluding the number of the repeating units replaced by the amine skeletons), p21 represents 0, and p22 and p23 each represent 3.

When a reaction product (trade name: X-12-5263HP, manufactured by Shin-Etsu Chemical Co., Ltd.), of N-2-(aminoethyl)-3-aminopropyltrimethoxysilane and chloropropyltrimethoxysilane, described in Japanese Laid-Open Patent Publication No. 2012-197330 and used as the compound (C) in Examples described below, is represented by the formula (c2), $R^{x20}$ and $R^{x21}$ each represent a hydrogen atom, p20 represents 8, p21 represents 0, the number of the amine skeletons is two ($R^{100}$ represents a hydrogen atom in each amine skeleton), both the ends are the same, p22 and p23 each represent 3, and $X^{20}$ and $X^{21}$ each represent a methoxy group.

The organosilicon compound (C2) is preferably represented by the following formula (c2-2).

[Chemical Formula 13]

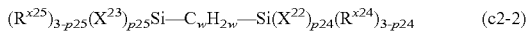

$(R^{x25})_{3-p25}(X^{23})_{p25}Si-C_wH_{2w}-Si(X^{22})_{p24}(R^{x24})_{3-p24}$ (c2-2)

In the formula (c2-2),
$X^{22}$ and $X^{23}$ each independently represent a hydrolyzable group, and, when the numbers of $X^{22}$s and $X^{23}$s are plural, the plurality of $X^{22}$s and the plurality of $X^{23}$s may be different from each other,
$R^{x24}$ and $R^{x25}$ each independently represent an alkyl group having 1 to 20 carbon atoms, and, when the numbers of $R^{x24}$s and $R^{x25}$s are plural, the plurality of $R^{x24}$s and the plurality of $R^{x25}$s may be different from each other,
at least one methylene group that is a part of $-C_wH_{2w}-$ is replaced by an amine skeleton $-NR^{100}-$, and $R^{100}$ represents a hydrogen atom or an alkyl group,
w represents an integer of 1 to 30 (excluding the number of the methylene groups replaced by the amine skeletons), and
p24 and p25 each independently represent an integer of 1 to 3.

$X^{22}$ and $X^{23}$ each preferably represent an alkoxy group, a halogen atom, a cyano group, or an isocyanate group, more preferably represents an alkoxy group, and even more preferably represents an alkoxy group having 1 to 4 carbon atoms (in particular, a methoxy group or an ethoxy group).

The number of the amine skeletons $-NR^{100}-$ may be plural. In this case, the number of the amine skeletons is preferably 1 to 10, more preferably 1 to 5, and even more preferably 2 to 5. Furthermore, in this case, an alkylene group is preferably located between the amine skeletons adjacent to each other. The number of carbon atoms in the alkylene group is preferably 1 to 10 and more preferably 1 to 5. The number of carbon atoms in the alkylene group between the amine skeletons adjacent to each other is included in the total number of w.

When $R^{100}$ represents an alkyl group in the amine skeleton $-NR^{100}-$, the number of carbon atoms is preferably not larger than 5 and more preferably not larger than 3. The amine skeleton $-NR^{100}-$ is preferably $-NH-$ ($R^{100}$ represents a hydrogen atom).

$R^{x24}$ and $R^{x25}$ each preferably represent an alkyl group having 1 to 10 carbon atoms, and more preferably represents an alkyl group having 1 to 5 carbon atoms.

p24 and p25 each preferably represent an integer of 2 to 3 and more preferably represent 3.

w is preferably not less than 1 and more preferably not less than 2, and preferably not larger than 20 and more preferably not larger than 10.

2-3. Organosilicon Compound (C) Represented by the Formula (c3) (Hereinafter, Referred to as Organosilicon Compound (C))

[Chemical Formula 14]

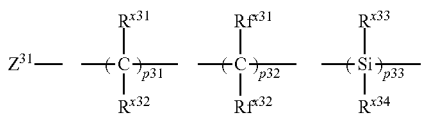

-continued

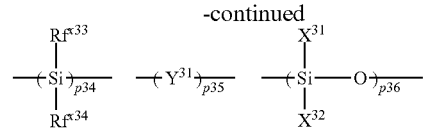

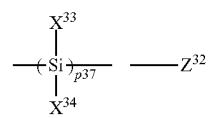

in the formula (c3),
$Z^{31}$ and $Z^{32}$ each independently represent a reactive functional group other than a hydrolyzable group and a hydroxy group. Examples of the reactive functional group include a vinyl group, an α-methylvinyl group, a styryl group, a methacryloyl group, an acryloyl group, an amino group, an epoxy group, a ureido group, and a mercapto group. $Z^{31}$ and $Z^{32}$ each preferably represent an amino group, a mercapto group, or a methacryloyl group, and particularly preferably represent an amino group.
$R^{x31}$, $R^{x32}$, $R^{x33}$, and $R^{x34}$ each independently represent a hydrogen atom or an alkyl group having 1 to 4 carbon atoms,
when the number of $R^{x31}$s is plural, the plurality of $R^{x31}$s may be different from each other,
when the number of $R^{x32}$s is plural, the plurality of $R^{x32}$s may be different from each other,
when the number of $R^{x33}$s is plural, the plurality of $R^{x33}$s may be different from each other,
when the number of $R^{x34}$s is plural, the plurality of $R^{x34}$s may be different from each other.
$R^{x31}$, $R^{x32}$, $R^{x33}$, and $R^{x34}$ each preferably represent a hydrogen atom or an alkyl group having 1 to 2 carbon atoms, more preferably represent a hydrogen atom.
$Rf^{x31}$, $Rf^{x32}$, $Rf^{x33}$, and $Rf^{x34}$ each independently represent a fluorine atom, or an alkyl group having 1 to 20 carbon atoms in which one or more hydrogen atom is substituted by a fluorine atom,
when the number of $Rf^{x31}$s is plural, the plurality of $Rf^{x31}$s may be different from each other,
when the number of $Rf^{x32}$s is plural, the plurality of $Rf^{x32}$s may be different from each other,
when the number of $Rf^{x33}$s is plural, the plurality of $Rf^{x33}$s may be different from each other,
when the number of $Rf^{x34}$s is plural, the plurality of $Rf^{x34}$s may be different from each other.
$Rf^{x31}$, $Rf^{x32}$, $Rf^{x33}$, and $Rf^{x34}$ each preferably represent a fluorine atom, or an alkyl group having 1 to 10 carbon atoms in which one or more hydrogen atom is substituted by a fluorine atom,
$Y^{31}$ represents $-NH-$, $-N(CH_3)-$, or $-O-$,
when the number of $Y^{31}$s is plural, the plurality of $Y^{31}$s may be different from each other. $Y^{31}$ preferably represents $-NH-$.
$X^{31}$, $X^{32}$, $X^{33}$, and $X^{34}$ each independently represent $-OR^c$ ($R^c$ represents a hydrogen atom, an alkyl group having 1 to 4 carbon atoms, or an aminoC$_{1-3}$alkyl diC$_{1-3}$alkoxysilyl group), when the number of $X^{31}$s is plural, the plurality of $X^{31}$s may be different from each other, when the number of $X^{32}$s is plural, the plurality of $X^{32}$s may be different from each other, when the number of $X^{33}$s is plural, the plurality of $X^{33}$s may be different from each other, when the number of $X^{34}$s is plural, the plurality of $X^{34}$s may be different from each other.

$X^{31}$, $X^{32}$, $X^{33}$, and $X^{34}$ each preferably represent —$OR^c$ in which $R^c$ represents a hydrogen atom or an alkyl group having 1 to 2 carbon atoms, and $R^c$ preferably represents a hydrogen atom.

p31 represents an integer of 0 to 20, p32, p33, and p34 each independently represent an integer of 0 to 10, p35 represents an integer of 0 to 5, p36 represents an integer of 1 to 10, p37 represents 0 or 1.

p31 preferably represents 1 to 15, more preferably 3 to 13, even more preferably 5 to 10.

preferably, p32, p33, and p34 each independently represent 0 to 5. It is more preferable that all of p32, p33, and p34 are 0 to 2.

p35 preferably represents 1 to 5, more preferably 1 to 3.

p36 preferably represents 1 to 5, more preferably 1 to 3.

p37 preferably represents 1.

The organosilicon compound (C3) is structured such that —{$C(R^{x31})(R^{x32})$}— whose number is p31; —{$C(Rf^{x31})(Rf^{x32})$}— whose number is p32; —{$Si(R^{x33})(R^{x34})$}— whose number is p33; —{$Si(Rf^{x33})(Rf^{x34})$}— whose number is p34; —$Y^{31}$— whose number is p35; —{$Si(X^{31})(X^{32})$—O}— whose number is p36; and —{$Si(X^{33})(X^{34})$}— whose number is p37 are aligned and bound in any order as long as a condition that at least one of $Z^{31}$ and $Z^{32}$ represents an amino group or at least one of $Y^{31}$s represents —NH— or —N(CH$_3$)— is satisfied, the ends are $Z^{31}$— and $Z^{32}$—, and —O— does not link to —O—. Regarding —{$C(R^{x31})(R^{x32})$}— whose number is p31, the units of —{$C(R^{x31})(R^{x32})$}— may not necessarily be continuously bound, and may be bound through another unit located therebetween as long as the total number of the units of —{$C(R^{x31})(R^{x32})$}— is p31. The same applies to units bracketed with each of p32 to p37.

The organosilicon compound (C3) is preferably a compound in which $Z^{31}$ and $Z^{32}$ each represent an amino group, $R^{x31}$ and $R^{x32}$ each represent a hydrogen atom, p31 represents 3 to 13 (preferably 5 to 10), $R^{x33}$ and $R^{x34}$ each represent a hydrogen atom, $Rf^{x31}$ to $Rf^{x34}$ each represent a fluorine atom, or an alkyl group having 1 to 10 carbon atoms in which one or more hydrogen atom is substituted by a fluorine atom, p32 to p34 each represent 0 to 5, $Y^{31}$ represents —NH—, p35 represents 0 to 5 (preferably, 0 to 3), $X^{31}$ to $X^{34}$ each represent —OH, p36 represents 1 to 5 (preferably, 1 to 3), and p37 represents 1.

The organosilicon compound (C3) is preferably represented by the following formula (c3-2).

In the formula (c3-2), $Z^{31}$, $Z^{32}$, $X^{31}$, $X^{32}$, $X^{33}$, $X^{34}$, $Y^{31}$ represent the same matters as those in the formula (c3), p41 to p44 each independently represent an integer of 1 to 6, and p45 and p46 each independently represent 0 or 1.

In the formula (c3-2), each of $Z^{31}$ and $Z^{32}$ preferably represents an amino group, a mercapto group, or a methacryloyl group, and particularly preferably represents an amino group. Each of $X^{31}$, $X^{32}$, $X^{33}$, and $X^{34}$ preferably represents —$OR^c$ in which $R^c$ represents a hydrogen atom or an alkyl group having 1 to 2 carbon atoms, and $R^c$ more preferably represents a hydrogen atom. $Y^{31}$ preferably represents —NH—. Each of p41 to p44 is preferably not less than 2, and is preferably not larger than 5 and more preferably not larger than 4. Each of p45 and p46 preferably represents 0.

The mixture composition (cc) is a composition in which the organosilicon compound (C) is mixed. When the mixture composition (cc) is obtained by mixing the organosilicon compound (C), and has a component other than the organosilicon compound (C) mixed therein, the mixture composition (cc) is obtained by mixing the organosilicon compound (C) and the other component. The mixture composition (cc) also includes a composition in which a reaction has been proceeded after mixing, for example, during storage.

Examples of the mixture composition (cc) in which a reaction has been proceeded during storage include the mixture composition (cc) containing a condensate of the organosilicon compound (C). More specifically, for example, the mixture composition (cc) includes an organosilicon compound (C3') obtained by condensing and binding the organosilicon compounds (C3) at the site of at least one of the above-described $X^{31}$ to $X^{34}$.

The organosilicon compound (C3') is a compound which has two or more structures (c31-1) represented by the following formula (c31-1) and in which the structures (c31-1) are bound at *3 or *4 described below so as to form a chain-like or cyclic form. The structures (c31-1) are bound at *3 or *4 described below by condensation of the above-described $X^{31}$s or $X^{32}$s of two or more organosilicon compounds (C3).

A group, in which at least one kind of units bracketed with p31, p32, p33, p34, p35, (p36)-1, p37 in the following formula (c31-2) are bound in any order and the end is Z—, is bound to each of *1 and *2 in the following formula (c31-1), and groups bound to *1 and *2 may be different for each of the plurality of the structures (c31-1), and when the plurality of the structures (c31-1) are bound so as to form a chain-like form, *3 at the end represents a hydrogen atom, and *4 represents a hydroxy group.

[Chemical Formula 15]

(c3-2)

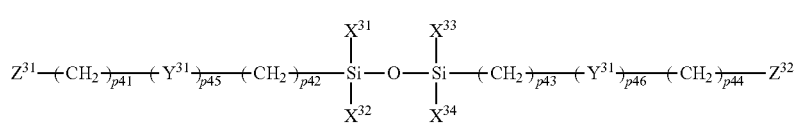

[Chemical Formula 16]

(c31-1)

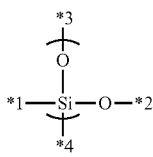

[Chemical Formula 17]

(c31-2)

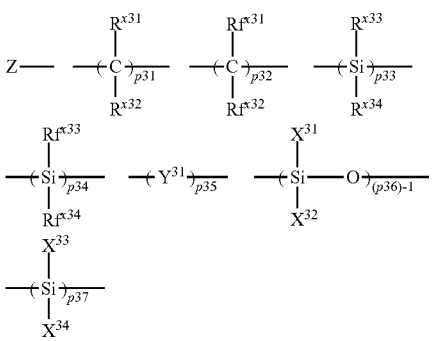

In the formula (c31-2),

Z represents a reactive functional group other than a hydrolyzable group and a hydroxy group, and $R^{x31}$, $R^{x32}$, $R^{x33}$, $R^{x34}$, $Rf^{x31}$, $Rf^{x32}$, $Rf^{x33}$, $Rf^{x34}$, $Y^{31}$, $X^{31}$, $X^{32}$, $X^{33}$, $X^{34}$ and p31 to p37 are the same as those represented by the same reference characters in the formula (c3).

When the organosilicon compound (C3) is a compound represented by the formula (c3-2), examples of the organosilicon compound (C3') include a compound in which the structures represented by the following formula (c31-3) are bound at *3 or *4 described below so as to form a chain-like or cyclic form. When the structures represented by the following formula (c31-3) are bound so as to form a chain-like form, *3 at the end represents a hydrogen atom and *4 at the end represents a hydroxy group.

[Chemical Formula 18]

(c31-3)

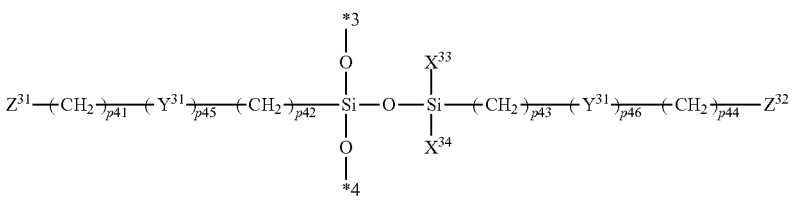

All the reference characters in the formula (c31-3) are the same as those in the formula (c3-2).

The organosilicon compound (C3') is preferably a compound in which 2 to 10 (preferably, 3 to 8) structures represented by the formula (c31-3) are bound.

As the organosilicon compounds (C), only one kind may be used or two or more kinds may be used. As the organosilicon compound (C), at least the organosilicon compound (C1) and/or the organosilicon compound (C2) are preferably used, and at least the organosilicon compound (C2) is more preferably used.

The mixture composition (cc) preferably has a solvent (E) mixed therein. The solvent (E) is not particularly limited, and examples of the solvent (E) include water, alcohol-based solvents, ketone-based solvents, ether-based solvents, hydrocarbon-based solvents, and ester-based solvents. Water, alcohol-based solvents, ketone-based solvents, and hydrocarbon-based solvents are particularly preferable.

Examples of the alcohol-based solvents include methanol, ethanol, 1-propanol, 2-propanol (isopropyl alcohol), and 1-butanol.

Examples of the ketone-based solvents include acetone, methyl ethyl ketone, and methyl isobutyl ketone.

Examples of the ether-based solvents include diethyl ether, dipropyl ether, tetrahydrofuran, and 1,4-dioxane.

Examples of the hydrocarbon-based solvents include aliphatic hydrocarbon-based solvents such as pentane and hexane, alicyclic hydrocarbon-based solvents such as cyclohexane, and aromatic hydrocarbon-based solvents such as benzene, toluene, and xylene.

Examples of the ester-based solvents include ethyl acetate, propyl acetate, and butyl acetate.

When the total of the composition (cc) is 100 mass %, the total amount of the organosilicon compound (C) is preferably not less than 0.005 mass %, more preferably not less than 0.01 mass %, and even more preferably not less than 0.02 mass %, and preferably not larger than 5 mass %, more preferably not larger than 3 mass %, and even more preferably not larger than 2 mass %. The above-described amount of the organosilicon compound (C) can be adjusted when the composition is prepared. The amount of the organosilicon compound (C) may be calculated from the analysis result of the composition. In the description herein, when a range of the amount of each component, or a mass ratio or a molar ratio among the components is described, the range can be adjusted when the composition is prepared as described above.

A thickness of the intermediate layer (c) is, for example, about 1 to 1000 nm.

3. Water-Repellent Layer (r)

The water-repellent layer (r) is a cured layer of a mixture composition (ca) of an organosilicon compound (A), and the mixture composition (ca) is more preferably a mixture composition of the organosilicon compound (A) and an organosilicon compound (B).

3-1. Organosilicon Compound (A)

The organosilicon compound (A) is a compound in which a monovalent group having a perfluoropolyether structure is bound to a silicon atom through a linking group or without a linking group located therebetween, and a hydrolyzable group is bound to the silicon atom through a linking group or without a linking group located therebetween. The water-repellent layer (r) is obtained by applying and curing the composition (ca), and has a structure derived from the organosilicon compound (A). As described above, the organosilicon compound (A) has a hydrolyzable group bound to a silicon atom (may be bound through a linking group located therebetween), and —SiOH groups (Si and OH may be bound through a linking group located therebetween) of the organosilicon compounds (A) generated by hydrolysis dehydrate and condense with each other, and the water-repellent layer (r) thus has a condensed structure derived from the organosilicon compound (A) in general. Examples of the hydrolyzable group include an alkoxy group, a halogen atom, a cyano group, an acetoxy group, and an isocyanate group.

The perfluoropolyether structure can also be referred to as a perfluorooxyalkylene group. The perfluoropolyether structure has liquid repellency such as water repellency or oil repellency. The number of carbon atoms contained in the longest linear chain portion in the perfluoropolyether structure is, for example, preferably not less than 5, more preferably not less than 10, and even more preferably not less than 20. The upper limit of the number of the carbon atoms is not particularly limited, but may be, for example, about 200. Furthermore, the monovalent group having the perfluoropolyether structure in the organosilicon compound (A) preferably has a perfluoroalkyl group at a free end.

The water-repellent layer (r) can be represented as a layer having the perfluoropolyether structure and a polysiloxane skeleton, and preferably further includes a perfluoroalkyl group. The water-repellent layer (r) preferably has a structure in which a monovalent group having a perfluoroalkyl group at a free end and the perfluoropolyether structure is bound to a part of silicon atoms of the polysiloxane skeleton. The presence of perfluoroalkyl group at the free end side improve water-repellency.

The number of carbon atoms (in particular, the number of carbon atoms in the longest linear chain portion) of the perfluoroalkyl group is, for example, preferably not less than 3, more preferably not less than 5, and even more preferably not less than 7. The upper limit of the number of the carbon atoms is not particularly limited, but may be, for example, about 20, and, also in this case, excellent water repellent properties are exhibited.

The perfluoroalkyl group may form a fluorine-containing group such as a fluoroalkyl group by binding to a hydrocarbon group and/or a group in which at least a part of hydrogen atoms in a hydrocarbon group is substituted by a fluorine atom, and examples of the fluoroalkyl group include $CF_3(CF_2)_m$—$(CH_2)_n$— and $CF_3(CF_2)_m$—$C_6H_4$ (in each of them, m represents 1 to 10 and preferably represents 3 to 7, and n represents 1 to 5 and preferably represents 2 to 4), and the fluoroalkyl group is preferably $CF_3(CF_2)_m$—$(CH_2)_n$— (m represents 1 to 10 and preferably represents 3 to 7, and n represents 1 to 5 and preferably represents 2 to 4). The perfluoroalkyl group is more preferably bound directly to the perfluoropolyether structure.

In the organosilicon compound (A), a monovalent group having the perfluoropolyether structure and a silicon atom may be bound through an appropriate linking group located therebetween, or a monovalent group having the perfluoropolyether may be bound directly to a silicon atom without a linking group located therebetween. Examples of the linking group include a hydrocarbon group such as an alkylene group and an aromatic hydrocarbon group, a (poly) alkylene glycol group, a group in which a part of hydrogen atoms in these groups is substituted by F or a substituent, and a group in which these groups are appropriately linked. The number of carbon atoms in the linking group is, for example, not less than 1 and not larger than 20, and preferably not less than 2 and preferably not larger than 15.

The hydrolyzable group has the effect of binding the organosilicon compounds (A) to each other or bind the organosilicon compound (A) and active hydrogen (such as hydroxy group) on the surface of the substrate, through hydrolysis and dehydration-condensation reaction. Examples of such a hydrolyzable group include an alkoxy group (in particular, an alkoxy group having 1 to 4 carbon atoms), a hydroxy group, an acetoxy group, and a halogen atom (in particular, chlorine atom). The hydrolyzable group is preferably an alkoxy group and a halogen atom, and is particularly preferably a methoxy group, an ethoxy group, and a chlorine atom.

The hydrolyzable group may be bound to a silicon atom through a linking group located therebetween, or may be bound directly to a silicon atom without a linking group located therebetween. The number of the hydrolyzable groups to be bound to a silicon atom may be not less than 1, or may be 2 or 3. However, the number thereof is preferably 2 or 3 and particularly preferably 3. When two or more hydrolyzable groups are bound to a silicon atom, different hydrolyzable groups may be bound to a silicon atom. However, the same hydrolyzable groups are preferably bound to a silicon atom. The total of the number of fluorine-containing groups to be bound to a silicon atom and the number of hydrolyzable groups to be bound to the silicon atom is 4 in general, but may be 2 or 3 (in particular, 3). When the total number is not larger than 3, a monovalent group other than a hydrolyzable group may be bound to a remaining bond, and, for example, an alkyl group (in particular, an alkyl group having 1 to 4 carbon atoms), H, NCO, or the like can be bound.

The monovalent group having the perfluoropolyether structure in the organosilicon compound (A) may be linear or may have a side chain, and is preferably linear.

The organosilicon compound (A) may be represented by, for example, the following formula (a).

[Chemical Formula 19]

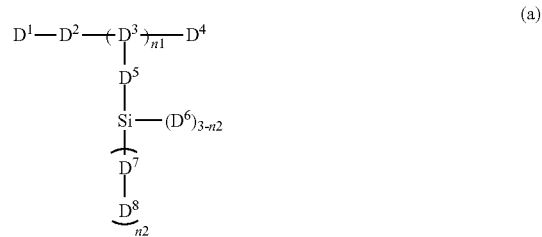

(a)

In the formula (a), $D^1$ represents a monovalent group having the perfluoropolyether structure, an end of $D^1$ on the side bound to $D^2$ is —$CF_2$—O—* or —$CFD^9$-* (* represents a bond at $D^2$), $D^2$ represents a single bond or a divalent hydrocarbon group in which substitution by a fluorine atom is not contained, $D^3$ represents a trivalent hydrocarbon group in which substitution by a fluorine atom is not contained, a part of methylene groups in the hydrocarbon group may be replaced by an oxygen atom, $D^4$ represents a hydrogen atom or a fluorine atom, $D^5$ represents a single bond or a divalent hydrocarbon group, $D^6$ represents a monovalent group other than a hydrolyzable group, $D^7$ represents a divalent group or a single bond, $D^8$ represents a hydrolyzable group, $D^9$ represents a hydrogen atom, a fluorine atom, or a hydrocarbon group, n1 represents 1 to 30, and n2 represents 1 to 3. Examples of the hydrolyzable group as $D^8$ include the above-described groups.

The organosilicon compound (A) is preferably represented by the following formula (a1).

[Chemical Formula 20]

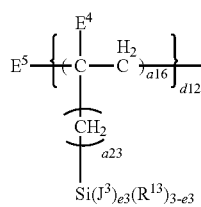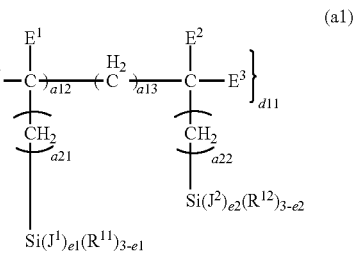

(a1)

in the formula (a1),
$Rf^{a1}$ represents a divalent perfluoropolyether structure in which both ends are oxygen atoms,
$R^{11}$, $R^{12}$, and $R^{13}$ each independently (that is, $R^{11}$, $R^{12}$, and $R^{13}$ may be the same or may be different from each other) represent an alkyl group having 1 to 20 carbon atoms,
when the number of $R^{11}$s is plural, the plurality of $R^{11}$s may be different from each other,
when the number of $R^{12}$s is plural, the plurality of $R^{12}$s may be different from each other,
when the number of $R^{13}$s is plural, the plurality of $R^{13}$s may be different from each other,
$E^1$, $E^2$, $E^3$, $E^4$, and $E^5$ each independently represent a hydrogen atom or a fluorine atom,
when the number of $E^1$s is plural, the plurality of $E^1$s may be different from each other,
when the number of $E^2$s is plural, the plurality of $E^2$s may be different from each other,
when the number of $E^3$s is plural, the plurality of $E^3$s may be different from each other,
when the number of $E^4$s is plural, the plurality of $E^4$s may be different from each other,
$G^1$ and $G^2$ each independently represent a 2 to 10 valent organosiloxane group having a siloxane bond,
$J^1$, $J^2$, and $J^3$ each independently represent a hydrolyzable group or $-(CH_2)_{e6}-Si(OR^{14})_3$,
e6 represents 1 to 5,
$R^{14}$ represents a methyl group or an ethyl group,
when the number of $J^1$s is plural, the plurality of $J^1$s may be different from each other,
when the number of $J^2$s is plural, the plurality of $J^2$s may be different from each other,
when the number of $J^3$s is plural, the plurality of $J^3$s may be different from each other,
$L^1$ and $L^2$ each independently represent a divalent linking group that has 1 to 12 carbon atoms and may contain an oxygen atom, a nitrogen atom, or a fluorine atom,
when the number of $L^1$s is plural, the plurality of $L^1$s may be different from each other,
when the number of $L^2$s is plural, the plurality of $L^2$s may be different from each other,
d11 represents 1 to 9,
d12 represents 0 to 9,
a10 and a14 each independently represent 0 to 10,
a11 and a15 each independently represent 0 or 1,
a12 and a16 each independently represent 0 to 9,
a13 represents 0 or 1,
a21, a22, and a23 each independently represent 0 to 2, and
e1, e2, and e3 each independently represent 1 to 3.

The organosilicon compound (A) has the perfluoropolyether structure represented by $Rf^{a1}$ and has at least one of a hydrolyzable group and $-(CH_2)_{e6}-Si(OR^{14})_3$ (where $R^{14}$ represents a methyl group or an ethyl group) represented by $J^2$, as represented by formula (a1). The perfluoropolyether structure is structured such that all hydrogen atoms in a polyoxyalkylene group are replaced by fluorine atoms, and can also be referred to as a perfluorooxyalkylene group, and can impart water-repellency to the obtained coating film. The organosilicon compounds (A) are bound to each other by $J^2$ or the organosilicon compound (A) and another monomer are bound by $J^2$, through polymerization reaction (in particular, polycondensation reaction), to allow the organosilicon compound (A) to become a matrix of the obtained coating film.

$Rf^{a1}$ preferably represents $-O-(CF_2CF_2O)_{e4}-$ or $-O-(CF_2CF_2CF_2O)_{e5}-$. e4 and e5 each represent 15 to 80.

Preferably, $R^{11}$, $R^{12}$, and $R^{13}$ each independently represent an alkyl group having 1 to 10 carbon atoms.

Preferably, $L^1$ and $L^2$ each independently represent a divalent linking group that has 1 to 5 carbon atoms and contains a fluorine atom.

Preferably, $G^1$ and $G^2$ each independently represent a 2 to 5 valent organosiloxane group having a siloxane bond.

Preferably, $J^1$, $J^2$, and $J^3$ each independently represent a methoxy group, an ethoxy group or $-(CH_2)_{e6}-Si(OR^{14})_3$.

a10 preferably represents 0 to 5 (more preferably 0 to 3), a12 preferably represents 0, a13 preferably represents 0 to 7 (more preferably 0 to 5), a14 preferably represents 1 to 6 (more preferably 1 to 3), a15 preferably represents 0, a16 preferably represents 0 to 6, a21 to a23 each preferably represent 0 or 1 (more preferably 0), d11 preferably represents 1 to 5 (more preferably 1 to 3), d12 preferably represents 0 to 3 (more preferably 0 or 1), e1 to e3 each preferably represent 3. a13 preferably represents 1.

The organosilicon compound (A) is preferably a compound in which, in the formula (a1), $Rf^{a1}$ represents $-O-(CF_2CF_2CF_2O)_{e5}-$, e5 represents 35 to 50, $L^1$ and $L^2$ each represent a perfluoroalkylene group having 1 to 3 carbon atoms, $E^1$, $E^2$, and $E^3$ each represent a hydrogen atom, $E^4$ and $E^5$ each represent a hydrogen atom or a fluorine atom, $J^1$, $J^2$, and $J^3$ each represent a methoxy group or an ethoxy group (in particular, a methoxy group), a10 represents 1 to 3, a11 represents 0, a12 represents 0 to 5, a13 represents 1, a14 represents 2 to 5, a15 represents 0, a16 represents 0 to 6, a21 to a23 each independently represents 0 or 1 (more preferably all of a21 to a23 represent 0), d11 represents 1, d12 represents 0 or 1, and e1 to e3 each represents 3.

The organosilicon compound (A) is also preferably a compound, in the formula (a1), $Rf^{a1}$ represents $-O-(CF_2CF_2CF_2O)_{e5}-$, e5 represents 25 to 40, $L^1$ represents a divalent linking group that has 3 to 6 carbon atoms and contains a fluorine atom and an oxygen atom, $L^2$ represents a perfluoroalkylene group having 1 to 3 carbon atoms, $E^2$ and $E^3$ each represent a hydrogen atom, $E^5$ represents a fluorine atom, $J^2$ represents $—(CH_2)_{e6}—Si(OCH_3)_3$, e6 represents 2 to 4, a10 represents 1 to 3, a11 represents 0, a12 represents 0, a13 represents 0, a14 represents 2 to 5, a15 represents 0, a16 represents 0, a21 to a23 each independently represent 0 or 1 (more preferably, all of a21 to a23 represent 0), d11 represents 1, d12 represents 0, and e2 represents 3.

The organosilicon compound (A) is also preferably a compound represented by the following formula (a2-1).

[Chemical Formula 21]

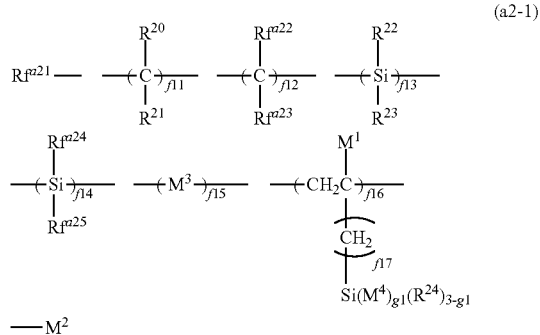

(a2-1)

In the formula (a2-1), $Rf^{a21}$ represents a fluorine atom, or an alkyl group having 1 to 20 carbon atoms in which one or more hydrogen atom is substituted by a fluorine atom, $Rf^{a22}$, $Rf^{a23}$, $Rf^{a24}$, and $Rf^{a25}$ each independently represent a fluorine atom, or an alkyl group having 1 to 20 carbon atoms in which one or more hydrogen atom is substituted by a fluorine atom, when the number of $Rf^{a22}$s is plural, the plurality of $Rf^{a22}$s may be different from each other, when the number of $Rf^{a23}$s is plural, the plurality of $Rf^{a23}$s may be different from each other, when the number of $Rf^{a24}$s is plural, the plurality of $Rf^{a24}$s may be different from each other, when the number of $Rf^{a25}$s is plural, the plurality of $Rf^{a25}$s may be different from each other, $R^{20}$, $R^{21}$, $R^{22}$, and $R^{23}$ each independently represent a hydrogen atom or an alkyl group having 1 to 4 carbon atoms, when the number of $R^{20}$s is plural, the plurality of $R^{20}$s may be different from each other, when the number of $R^{21}$s is plural, the plurality of $R^{21}$s may be different from each other, when the number of $R^{22}$s is plural, the plurality of $R^{22}$s may be different from each other, when the number of $R^{23}$s is plural, the plurality of $R^{23}$s may be different from each other, $R^{24}$ represents an alkyl group having 1 to 20 carbon atoms, when the number of $R^{24}$s is plural, the plurality of $R^{24}$s may be different from each other, $M^1$ represents a hydrogen atom or an alkyl group having 1 to 4 carbon atoms, when the number of $M^1$s is plural, the plurality of $M^1$s may be different from each other, $M^2$ represents a hydrogen atom or a halogen atom, $M^3$ represents $—O—$, $—C(=O)—O—$, $—O—C(=O)—$, $—NR—$, $—NRC(=O)—$, or $—C(=O)NR—$ (R represents a hydrogen atom, an alkyl group having 1 to 4 carbon atoms, or a fluorine-containing alkyl group having 1 to 4 carbon atoms), when the number of $M^3$s is plural, the plurality of $M^3$s may be different from each other, $M^4$ represents a hydrolyzable group, when the number of $M^4$s is plural, the plurality of $M^4$s may be different from each other, f11, f12, f13, f14, and f15 each independently represent an integer of 0 to 600, and the total value of f11, f12, f13, f14, and f15 represents not less than 13, f16 represents an integer of 1 to 20, f17 represents an integer of 0 to 2, g1 represents an integer of 1 to 3, and $Rf^{a21}—$; $M^2-$; $—\{C(R^{20})(R^{21})\}—$ whose number is f11; $—\{C(Rf^{a22})(Rf^{a23})\}—$ whose number is f12; $—\{Si(R^{22})(R^{23})\}—$ whose number is f13, $—\{Si(Rf^{a24})(Rf^{a25})\}—$ whose number is f14; $-M^3-$ whose number is f15; and $—[CH_2C(M^1)\{(CH_2)_{f17}—Si(M^4)_{g1}(R^{24})_{3-g1}\}]—$ whose number is f16 are aligned and bound in any order as long as they are aligned in such an order that $Rf^{a21}—$ and $M^2-$ are located at ends and a perfluoropolyether structure is formed in at least a part thereof, and $—O—$ does not link to $—O—$ and $—F$. That is, in the formula (a2-1), $—\{C(R^{20})(R^{21})\}—$ whose number is f11 may not necessarily be continuous, $—\{C(Rf^{a22})(Rf^{a23})\}—$ whose number is f12 may not necessarily be continuous, $—\{Si(R^{22})(R^{23})\}—$ whose number is f13 may not necessarily be continuous, $—\{Si(Rf^{a24})(Rf^{a25})\}—$ whose number is f14 may not necessarily be continuous, t $-M^3-$ whose number is f15 may not necessarily be continuous, and $—[CH_2C(M^1)\{(CH_2)_{f17}—Si(M^4)_{g1}(R^{24})_{3-g1}\}]—$ whose number is f16 may not necessarily be continuous, and they may not necessarily be aligned in this order, and can be aligned in any order such as $—C(R^{20})(R^{21})—Si(Rf^{a24})(Rf^{a25})—CH_2C(M^1)\{(CH_2)_{f17}—Si(M^4)_{g1}(R^{24})_{3-g1}\}—C(Rf^{a22})(Rf^{a23})-M^3-Si(R^{22})(R^{23})—C(Rf^{a22})(Rf^{a23})—$.

$Rf^{a21}$ preferably represents an alkyl group having 1 to 10 carbon atoms in which one or more hydrogen atom is substituted by a fluorine atom, more preferably represents a perfluoroalkyl group having 1 to 10 carbon atoms, and even more preferably represents a perfluoroalkyl group having 1 to 5 carbon atoms.

Preferably, $Rf^{a22}$, $Rf^{a23}$, $Rf^{a24}$, and $Rf^{a25}$ each independently represent a fluorine atom, or an alkyl group having 1 to 2 carbon atoms in which one or more hydrogen atom is substituted by a fluorine atom, and all of them more preferably represent fluorine atoms.

Preferably, $R^{20}$, $R^{21}$, $R^{22}$, and $R^{23}$ each independently represent a hydrogen atom or an alkyl group having 1 to 2 carbon atoms, and all of them more preferably represent hydrogen atoms.

$R^{24}$ represents an alkyl group having 1 to 5 carbon atoms.

Preferably, $M^1$ each independently represents a hydrogen atom or an alkyl group having 1 to 2 carbon atoms, and $M^1$ each more preferably represents hydrogen atom.

$M^2$ preferably represents a hydrogen atom

Preferably, $M^3$ represents $—C(=O)—O—$, $—O—$, or $—O—C(=O)—$, $M^3$ each more preferably represents $—O—$.

$M^4$ preferably represents an alkoxy group, or a halogen atom, more preferably represents a methoxy group, an ethoxy group, of a chlorine atom.

f11, f13, and f14 each are preferably not larger than ½ of f12, more preferably not larger than ¼ of f12. It is further preferable that f13 or f14 represents 0. It is particularly preferable that f13 and f14 are 0.

f15 is preferably not less than ⅕ of the total value of f11, f12, f13 and f14, and not larger than the total value of f11, f12, f13 and f14.

f12 preferably represents 20 to 600, more preferably 20 to 200, even more preferably 50 to 200 (furthermore preferably 30 to 150, particularly preferably 50 to 150, and most preferably 80 to 140). f15 preferably represents 4 to 600, more preferably 4 to 200, even more preferably 10 to 200 (furthermore preferably 30 to 60). The total value of f11, f12, f13, f14 and f15 preferably represents 20 to 600, more preferably 20 to 200, even more preferably 50 to 200.

f16 preferably represents 1 to 18, more preferably 1 to 15, even more preferably 1 to 10.

f17 preferably represents 0 to 1.

g1 preferably represents 2 to 3, more preferably 3.

—{C($R^{20}$)($R^{21}$)}— whose number is f11; —{C($Rf^{a22}$)($Rf^{a23}$)}— whose number is f12; —{Si($R^{22}$)($R^{23}$)}— whose number is f13; —{Si($Rf^{a24}$)($Rf^{a25}$)}— whose number is f14; and -$M^3$- whose number is f15 may be aligned in any order in the formula as long as the perfluoropolyether structure is formed in at least a part thereof. However, a repeating unit bracketed with f12 (that is, —{C($Rf^{a22}$)($Rf^{a23}$)}—) on the side closest to the stationary end (side bound to a silicon atom) is preferably located closer to a free end than a repeating unit bracketed with f11 (that is, —{C($R^{20}$)($R^{21}$)}—) on the side closest to the free end is, and repeating units bracketed with f12 and f14 (that is, —{C($Rf^{a22}$)($Rf^{a23}$)}— and —{Si($Rf^{a24}$)($Rf^{a25}$)}—) on the side closest to the stationary end are more preferably located closer to the free end than repeating units bracketed with f11 and f13 (that is, —{C($R^{20}$)$R^{21}$)}— and —{Si($R^{22}$)($R^{23}$)}—) on the side closest to the free end are.

Preferably, in the formula (a2-1), $Rf^{a21}$ represents a perfluoroalkyl group having 1 to 5 carbon atoms, all of $Rf^{a22}$, $Rf^{a23}$, $Rf^{a24}$, and $Rf^{a25}$ are fluorine atoms, $M^3$ each represents —O—, $M^4$ each represents a methoxy group, an ethoxy group, or a chlorine atom (in particular, a methoxy group or an ethoxy group), $M^1$ and $M^2$ each represent hydrogen atoms, f11 represents 0, f12 represents 30 to 150 (more preferably 80 to 140), f15 represents 30 to 60, f13 and f14 represent 0, f17 represents 0 to 1 (in particular 0), g1 represents 3, and f16 represents 1 to 10.

The organosilicon compound (A) is preferably a compound represented by the following formula (a2-2).

[Chemical Formula 22]

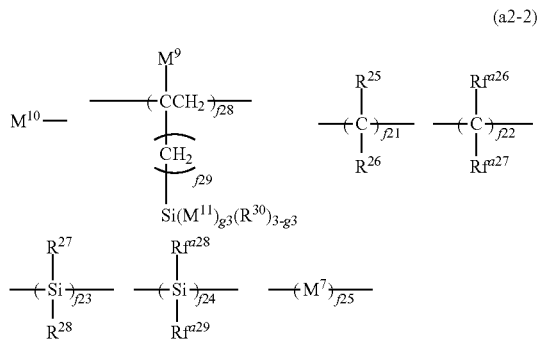

(a2-2)

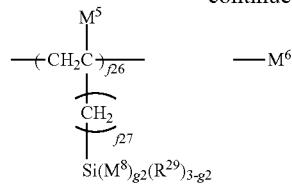

-continued

In the formula (a2-2), $Rf^{a26}$, $Rf^{a27}$, $Rf^{a28}$, and $Rf^{a29}$ each independently represent a fluorine atom, or an alkyl group having 1 to 20 carbon atoms in which one or more hydrogen atom is substituted by a fluorine atom, when the number of $Rf^{a26}$s is plural, the plurality of $Rf^{a26}$s may be different from each other, when the number of $Rf^{a27}$s is plural, the plurality of $Rf^{a27}$s may be different from each other, when the number of $Rf^{a28}$s is plural, the plurality of $Rf^{a28}$s may be different from each other, when the number of $Rf^{a29}$s is plural, the plurality of $Rf^{a29}$s may be different from each other, $R^{25}$, $R^{26}$, $R^{27}$, and $R^{28}$ each independently represent a hydrogen atom or an alkyl group having 1 to 4 carbon atoms, when the number of $R^{25}$s is plural, the plurality of $R^{25}$s may be different from each other, when the number of $R^{26}$s is plural, the plurality of $R^{26}$s may be different from each other, when the number of $R^{27}$s is plural, the plurality of $R^{27}$s may be different from each other, when the number of $R^{28}$s is plural, the plurality of $R^{28}$s may be different from each other, $R^{29}$ and $R^{30}$ each independently represent an alkyl group having 1 to 20 carbon atoms, when the number of $R^{29}$s is plural, the plurality of $R^{29}$s may be different from each other, when the number of $R^{30}$s is plural, the plurality of $R^{30}$s may be different from each other, $M^7$ represents —O—, —C(=O)—O—, —O—C(=O)—, —NR—, —NRC(=O)—, or —C(=O)NR—, R represents a hydrogen atom, an alkyl group having 1 to 4 carbon atoms, or a fluorine-containing alkyl group having 1 to 4 carbon atoms, when the number of $M^7$s is plural, the plurality of $M^7$s may be different from each other, $M^5$ and $M^9$ each independently represent a hydrogen atom or an alkyl group having 1 to 4 carbon atoms, when the number of $M^5$s is plural, the plurality of $M^5$s may be different from each other, when the number of $M^9$s is plural, the plurality of $M^9$s may be different from each other, $M^6$ and $M^{10}$ each independently represent a hydrogen atom or a halogen atom, $M^8$ and $M^{11}$ each independently represent a hydrolyzable group, when the number of $M^8$s is plural, the plurality of $M^8$s may be different from each other, when the number of $M^{11}$s is plural, the plurality of $M^{11}$s may be different from each other, f21, f22, f23, f24, and f25 each independently represent an integer of 0 to 600, and the total value of f21, f22, f23, f24, and f25 is not less than 13, f26 and f28 each independently represent an integer of 1 to 20, f27 and f29 each independently represent an integer of 0 to 2, g2 and g3 each independently represent an integer of 1 to 3, and $M^{10}$-; $M^6$-; —{$C(R^{25})(R^{26})$}— whose number is f21; —{$C(Rf^{a26})(Rf^{a27})$}— whose number is f22; —{Si($R^{27}$)($R^{28}$)}— whose number is f23; —{Si($Rf^{a28}$)($Rf^{a29}$)}— whose number is f24; -$M^7$- whose number is f25; —[$CH_2C(M^5)\{(CH_2)_{f27}$—Si($M^8$)$_{g2}(R^{29})_{3-g2}$}]— whose number is f26; and —[$CH_2C(M^9)\{(CH_2)_{f29}$—Si($M^{11}$)$_{g3}(R^{30})_{3-g3}$}]— whose number is f28 are aligned and bound in any order as long as they are aligned in such an order that $M^{10}$- and $M^6$- are located at ends and the perfluoropolyether structure is formed in at least a part thereof, and —O— is not continuous with —O—. The alignment and binding in any order is the same as described for the formula (a2-1), and does not necessarily indicate that the repeating units are continuously aligned in the order as described in the formula (a2-2). Preferably, in the formula (a2-2), all of $Rf^{a26}$, $Rf^{a27}$, $Rf^{a28}$, and $Rf^{a29}$ are fluorine atoms, $M^7$ each represents —O—, all of $M^8$ and $M^{11}$ are methoxy groups, ethoxy groups, or chlorine atoms (in particular methoxy groups, or ethoxy groups), $M^5$, $M^6$ $M^9$ and $M^{10}$ each represent hydrogen atoms, f21 represents 0, f22 represents 30 to 150 (more preferably, 80 to 140), f25 represents 30 to 60, f23 and f24 represent 0, f27 and f29 represent 0 to 1 (particularly preferably, 0), g2 and g3 represent 3, f26 and f28 represent 1 to 10.

The specific example of the organic silicon compound (A) include a compound represented by the following formula (a3).

[Chemical Formula 23]

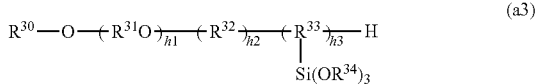

(a3)

In the formula (a3), $R^{30}$ represents a perfluoroalkyl group having 2 to 6 carbon atoms, $R^{31}$ and $R^{32}$ each independently represent a perfluoroalkylene group having 2 to 6 carbon atoms, $R^{33}$ represents a trivalent saturated hydrocarbon group having 2 to 6 carbon atoms, and $R^{34}$ represents an alkyl group having 1 to 3 carbon atoms. Preferably, the numbers of carbon atoms in $R^{30}$, $R^{31}$, $R^{32}$, $R^{33}$ each independently represent 2 to 4, and, more preferably, the numbers thereof each independently represent 2 to 3. h1 represents 5 to 70, h2 represents 1 to 5, and h3 represents 1 to 10. h1 preferably represents 10 to 60 and more preferably represents 20 to 50. h2 preferably represents 1 to 4 and more preferably represents 1 to 3. h3 preferably represents 1 to 8 and more preferably represents 1 to 6.

The organosilicon compound (A) also include a compound represented by the following formula (a4).

[Chemical Formula 24]

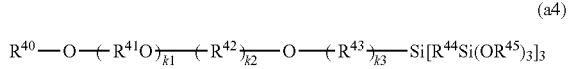

(a4)

In the formula (a4), $R^{40}$ represents a perfluoroalkyl group having 2 to 5 carbon atoms, $R^{41}$ represents a perfluoroal-kylene group having 2 to 5 carbon atoms, $R^{42}$ represents a fluoroalkylene group obtained by substituting a part of hydrogen atoms in an alkylene group having 2 to 5 carbon atoms by fluorine, $R^{43}$ and $R^{44}$ each independently represent an alkylene group having 2 to 5 carbon atoms, and $R^{45}$ represents a methyl group or an ethyl group. k1, k2, k3 each independently represent an integer of 1 to 5.

A number average molecular weight of the organosilicon compound (A) is preferably not less than 2,000, more preferably not less than 4,000, even more preferably not less than 6,000, particularly preferably not less than 7,000, and preferably not larger than 40,000, more preferably not larger than 20,000, even more preferably 15,000.

Examples of the organosilicon compound (A) include a compound represented by the following formula (1) or a compound having a structure similar to that of the compound, and include OPTOOL (registered trademark) UF503 manufactured by DAIKIN INDUSTRIES, LTD.

[Chemical Formula 25]

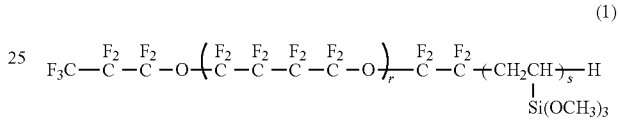

(1)

Examples of the compound represented by the formula (1) include a compound synthesized by methods described in synthesis examples 1 and 2 in Japanese Laid-Open Patent Publication No. 2014-15609, and r represents 43, s represents an integer of 1 to 6, and the number average molecular weight is about 8000.

Examples of the similar structure include a structure in which the number of carbon atoms in the hydrocarbon group or the number of carbon atoms in the hydrocarbon groups containing substitution by fluorine atoms is different from those in the formula (1), a structure in which the perfluoropolyether structure and a silicon atom are bound without a linking group located therebetween, a structure in which another hydrocarbon group (also including a hydrocarbon group in which at least a part of hydrogen atoms is substituted by fluorine atoms) is located at any position in a linking group between the perfluoropolyether structure and a silicon atom, a structure in which a silicon atom and a hydrolyzable group are bound through a linking group located therebetween, and a structure in which r and s represent different values. However, the similar structure is not limited to these structures.

As the organosilicon compounds (A), only one kind may be used, or two or more kinds may be used.

3-2. Organosilicon Compound (B)

The organosilicon compound (B) represented by the following formula (b1) has a hydrolyzable group represented by $A^2$ as described below. In general, a —SiOH group of the organosilicon compound (B) generated by hydrolysis is dehydration-condensed with a —SiOH group of the organosilicon compound (A) generated by hydrolysis and/or a —SiOH group of the organosilicon compound (B) generated by hydrolysis. Therefore, in a preferable mode, the water-repellent layer (r) that is a cured layer of the mixture composition (ca) has a condensed structure derived from the organosilicon compound (A) and a condensed structure derived from the organosilicon compound (B). Examples of the hydrolyzable group include an alkoxy group, a halogen atom, a cyano group, an acetoxy group, and an isocyanate group.

[Chemical Formula 26]

$$Rf^{b10}-\{C(R^{b11})(Rf^{b11})\}_{b11}-\{C(R^{b12})(Rf^{b12})\}_{b12}-\{Si(R^{b13})(Rf^{b13})\}_{b13}- \\ \{Si(R^{b14})(Rf^{b14})\}_{b14}-\{A^1\}_{b15}-Si(A^2)_c(R^{b15})_{3-c} \quad (b1)$$

In the formula (b1),
$Rf^{b10}$ represents a fluorine atom, or an alkyl group having 1 to 20 carbon atoms in which one or more hydrogen atom is substituted by a fluorine atom,
$R^{b11}$, $R^{b12}$, $R^{b13}$, and $R^{b14}$ each independently represent a hydrogen atom or an alkyl group having 1 to 4 carbon atoms,
when the number of $R^{b11}$s is plural, the plurality of $R^{b11}$s may be different from each other,
when the number of $R^{b12}$s is plural, the plurality of $R^{b12}$s may be different from each other,
when the number of $R^{b13}$s is plural, the plurality of $R^{b13}$s may be different from each other,
when the number of $R^{b14}$s is plural, the plurality of $R^{b14}$s may be different from each other,
$Rf^{b11}$, $Rf^{b12}$, $Rf^{b13}$, and $Rf^{b14}$ each independently represent a fluorine atom, or an alkyl group having 1 to 20 carbon atoms in which one or more hydrogen atom is substituted by a fluorine atom,
when the number of $Rf^{b11}$s is plural, the plurality of $Rf^{b11}$s may be different from each other,
when the number of $Rf^{b12}$s is plural, the plurality of $Rf^{b12}$s may be different from each other,
when the number of $Rf^{b13}$s is plural, the plurality of $Rf^{b13}$s may be different from each other,
when the number of $Rf^{b14}$s is plural, the plurality of $Rf^{b14}$s may be different from each other,
$R^{b15}$ represents an alkyl group having 1 to 20 carbon atoms,
when the number of $R^{b15}$s is plural, the plurality of $R^{b15}$s may be different from each other,
$A^1$ represents —O—, —C(=O)—O—, —O—C(=O)—, —NR—, —NRC(=O)—, or —C(=O)NR—,
R represents a hydrogen atom, an alkyl group having 1 to 4 carbon atoms, or a fluorine-containing alkyl group having 1 to 4 carbon atoms,
when the number of $A^1$s is plural, the plurality of $A^1$s may be different from each other,
$A^2$ represents a hydrolyzable group,
when the number of $A^2$s is plural, the plurality of $A^2$s may be different from each other,
b11, b12, b13, b14, and b15 each independently represent an integer of 0 to 100,
c represents an integer of 1 to 3, and
$Rf^{b10}-$; $-Si(A^2)_c(R^{b15})_{3-c}$; $-\{C(R^{b11})(Rf^{b11})\}-$ whose number is b11; $-\{C(R^{b12})(Rf^{b12})\}-$ whose number is b12; $-\{Si(R^{b13})(Rf^{b13})\}-$ whose number is b13; $-\{Si(R^{b14})(Rf^{b14})\}-$ whose number is b14; and $-A^1-$ whose number is b15 are aligned and bound in any order as long as $Rf^{b10}-$ and $-Si(A^2)_c(R^{b15})_{3-c}$ are located at ends, no perfluoropolyether structure is formed, and —O— does not link to —O— and —F.

$Rf^{b10}$ each independently represents a fluorine atom or a perfluoroalkyl group having 1 to 10 (more preferably 1 to 5) carbon atoms.

$R^{b11}$, $R^{b12}$, $R^{b13}$, and $R^{b14}$ preferably represent hydrogen atoms.

$R^{b15}$ preferably represents an alkyl group having 1 to 5 carbon atoms.

$A^1$ preferably represents —O—, —C(=O)—O—, or —O—C(=O)—.

$A^2$ preferably represents an alkoxy group having 1 to 4 carbon atoms or a halogen atom, more preferably represents a methoxy group, an ethoxy group, or a chlorine atom.

b11 preferably represents 1 to 30, more preferably represents 1 to 25, even more preferably represents 1 to 10, particularly preferably represents 1 to 5, and most preferably 1 to 2.

b12 preferably represents 0 to 15, and more preferably represents 0 to 10.

b13 preferably represents 0 to 5, and more preferably represents 0 to 2.

b14 preferably represents 0 to 4, and more preferably represents 0 to 2.

b15 preferably represents 0 to 4, and more preferably represents 0 to 2.

c preferably represents 2 to 3, and more preferably represents 3.

The total value of b11, b12, b13, b14 and b15 preferably represents not less than 3, more preferably represents not less than 5, and preferably represents not larger than 80, more preferably represents not larger than 50, and even more preferably represents not larger than 20.

In particular, it is preferable that $Rf^{b10}$ represents a fluorine atom or a perfluoroalkyl group having 1 to 5 carbon atoms, $R^{b11}$ and $R^{b12}$ each represent hydrogen atoms, $A^2$ represents a methoxy group or an ethoxy group, b11 represents 1 to 5, b12 represents 0 to 5, all of b13, b14 and b15 represent 0, and c represents 3.

When FAS 13E used as the compound (B) in Examples described below, is represented by the formula (b1), $R^{b11}$ and $R^{b12}$ each represent hydrogen atoms, b11 represents 2, all of b13, b14 and b15 represent 0, c represents 3, $A^2$ represents an ethoxy group, and $Rf^{b10}-\{C(Rf^{b11})(Rf^{b12})\}_{b12}-$ is located at end and represents $C_6F_{13}-$.

The specific examples of a compound represented by the formula (b1) include $CF_3-Si-(OCH_3)_3$, $C_jF_{2j+1}-Si-(OC_2H_5)_3$ (j represents an integer of 1 to 12). Among them, in particular, $C_4F_9-Si-(OC_2H_5)_3$, $C_6F_{13}-Si-(OC_2H_5)_3$, $C_7F_{15}-Si-(OC_2H_5)_3$, and $C_8F_{17}-Si-(OC_2H_5)_3$ are preferable. Further, the specific examples include $CF_3CH_2O(CH_2)_kSiCl_3$, $CF_3CH_2O(CH_2)_kSi(OCH_3)_3$, $CF_3CH_2O(CH_2)_kSi(OC_2H_5)_3$, $CF_3(CH_2)_2Si(CH_3)_2(CH_2)_kSiCl_3$, $CF_3(CH_2)_2Si(CH_3)_2(CH_2)_kSi(OCH_3)_3$, $CF_3(CH_2)_2Si(CH_3)_2(CH_2)_kSi(OC_2H_5)_3$, $CF_3(CH_2)_6Si(CH_3)_2(CH_2)_kSiCl_3$, $CF_3(CH_2)_6Si(CH_3)_2(CH_2)_kSi(OCH_3)_3$, $CF_3(CH_2)_6Si(CH_3)_2(CH_2)_kSi(OC_2H_5)_3$, $CF_3COO(CH_2)_kSiCl_3$, $CF_3COO(CH_2)_kSi(OCH_3)_3$, and $CF_3COO(CH_2)_kSi(OC_2H_5)_3$ (k each represents 5 to 20, and preferably represents 8 to 15.). In addition, the specific examples include $CF_3(CF_2)_m-(CH_2)_nSiCl_3$, $CF_3(CF_2)_m-(CH_2)_nSi(OCH_3)_3$, and $CF_3(CF_2)_m-(CH_2)_nSi(OC_2H_5)_3$ (m each represents 1 to 10, preferably represents 3 to 7, n each represents 1 to 5, and more preferably represents 2 to 4.). The specific examples also include $CF_3(CF_2)_p-(CH_2)_q-Si-(CH_2CH=CH_2)_3$ (p represents 2 to 10, preferably represents 2 to 8, q represents 1 to 5, and preferably represents 2 to 4.). In addition, the specific examples include $CF_3(CF_2)_p$—$(CH_2)_q SiCH_3Cl_2$, $CF_3(CF_2)_p$—$(CH_2)_q SiCH_3(OCH_3)_2$, and $CF_3(CF_2)_p$—$(CH_2)_q SiCH_3(OC_2H_5)_2$ (p each represents 2 to 10, more preferably represents 3 to 7, q each represents 1 to 5, more preferably represent 2 to 4.).

Among the compounds represented by the formula (b1), a compound represented by the following formula (b2) is preferable.

[Chemical Formula 27]

$R^{60}$—$R^{61}$—$Si(OR^{62})_3$ (b2)

In the formula (b2), $R^{60}$ represents a perfluoroalkyl group having 3 to 8 carbon atoms, $R^{61}$ represents an alkylene group having 1 to 5 carbon atoms, and $R^{62}$ represents an alkyl group having 1 to 3 carbon atoms.

As the organosilicon compound (B), only one kind may be used, or two or more kinds may be used.

The mixture composition (ca) is a composition in which the organosilicon compound (A) is mixed, and is preferably a composition in which the organosilicon compound (A) and the organosilicon compound (B) are mixed, and is obtained by mixing the organosilicon compound (A) and, as necessary, the organosilicon compound (B). When a component other than the organosilicon compound (A) and the organosilicon compound (B) is mixed, the mixture composition (ca) is obtained by mixing the organosilicon compound (A), and, as necessary, the organosilicon compound (B) and the other component. The mixture composition (ca) also includes a composition in which a reaction has been proceeded after mixing, for example, during storage.

3-3. Solvent (D)

In the mixture composition (ca), a solvent (D) is mixed in general. As the solvent (D), a fluorine-based solvent is preferably used, and, for example, a fluorinated ether-based solvent, a fluorinated amine-based solvent, a fluorinated hydrocarbon-based solvent, or the like can be used. A solvent having a boiling point of not lower than 100° C. is particularly preferable. As the fluorinated ether-based solvent, hydrofluoroether such as fluoroalkyl (in particular, perfluoroalkyl group having 2 to 6 carbon atoms)-alkyl (in particular, methyl group or ethyl group) ether is preferable, and examples thereof include ethyl nonafluorobutyl ether and ethyl nonafluoroisobutyl ether. Examples of the ethyl nonafluorobutyl ether or ethyl nonafluoroisobutyl ether include Novec (registered trademark) 7200 (manufactured by 3M, molecular weight of about 264). As the fluorinated amine-based solvent, amine in which at least one hydrogen atom in ammonia is substituted by a fluoroalkyl group is preferable. A tertiary amine in which all hydrogen atoms in ammonia are substituted by fluoroalkyl groups (in particular, perfluoroalkyl groups) is preferable. Specific examples of the fluorinated amine-based solvent include tris(heptafluoropropyl)amine, and Fluorinert (registered trademark) FC-3283 (manufactured by 3M, molecular weight of about 521) corresponds thereto. Examples of the fluorinated hydrocarbon-based solvent include a fluorinated aliphatic hydrocarbon-based solvent such as 1,1,1,3,3-pentafluorobutane and a fluorinated aromatic hydrocarbon-based solvent such as 1,3-bis(trifluoromethyl benzene). Examples of 1,1,1,3,3-pentafluorobutane include SOLVE 55 (manufactured by SOLVEX INC.).

As the fluorine-based solvent other than the above-described solvents, for example, hydrochlorofluorocarbon such as ASAHIKLIN (registered trademark) AK225 (manufactured by Asahi Glass Co., Ltd.) and hydrofluorocarbon such as ASAHIKLIN (registered trademark) AC2000 (manufactured by Asahi Glass Co., Ltd.) can be used.

As the solvent (D), at least fluorinated amine-based solvent is preferably used. Furthermore, as the solvent (D), two or more kinds of fluorine-based solvents are preferably used, and the fluorinated amine-based solvent and the fluorinated hydrocarbon-based solvent (in particular, fluorinated aliphatic hydrocarbon-based solvent) are preferably used.

An amount of the organosilicon compound (A) in the mixture composition (ca) is, for example, not less than 0.05 mass %, preferably not less than 0.1 mass %, and more preferably not less than 0.2 mass %, and preferably not larger than 1.0 mass %, more preferably not larger than 0.8 mass %, and even more preferably not larger than 0.6 mass %, with respect to 100 mass % of the entirety of the composition.

An amount of the organosilicon compound (B) in the mixture composition (ca) is, for example, not less than 0.01 mass % and preferably not less than 0.03 mass %, and preferably not larger than 0.3 mass % and more preferably not larger than 0.2 mass %, with respect to 100 mass % of the entirety of the composition.

A mass ratio of the organosilicon compound (B) to the organosilicon compound (A) is preferably not less than 0.05, more preferably not less than 0.08, and even more preferably not less than 0.10, and preferably not larger than 2.0, more preferably not larger than 1.0, and even more preferably not larger than 0.6.

The amounts of the organosilicon compounds (A) and (B) can be adjusted when the composition is prepared. The amounts of the organosilicon compounds (A) and (B) may be calculated from the analysis result of the composition.

The mixture composition (ca) for forming the water-repellent layer (r) may have various additives mixed therein as long as the effect of the present invention is not inhibited, and examples of the additive include a silanol condensation catalyst, an antioxidant, a rust inhibitor, an ultraviolet absorber, a light stabilizer, an antifungal agent, an antibacterial agent, a biofouling inhibitor, a deodorant, pigment, a flame retardant, and an antistatic agent.

A thickness of the water-repellent layer (r) is, for example, about 1 to 1000 nm.

In the laminate of the present invention, a ratio (absolute value of Sa(c)/absolute value of Sa(s)) of an absolute value of an arithmetic average height Sa(c) of the intermediate layer (c) before the water-repellent layer (r) is laminated, relative to an absolute value of an arithmetic average height Sa(s) of the substrate (s) before the intermediate layer (c) is laminated, is preferably less than 100%.

The hard coat layer as disclosed in Patent Literature 1 has a sufficiently low surface roughness (in the present invention, the surface roughness is evaluated based on the arithmetic average height) in general. Therefore, in a case where another layer is laminated on the hard coat layer, the surface roughness of the other layer is equivalent to or larger than the surface roughness of the hard coat layer on which the other layer has not been laminated yet, in general. Therefore, in a preferable mode of the present invention, the matter that the ratio (absolute value of Sa(c)/absolute value of Sa(s)) of an absolute value of the arithmetic average height Sa(c) of the intermediate layer (c) before the water-repellent layer (r) is laminated, relative to an absolute value of the arithmetic average height Sa(s) of the substrate (s) before the layer (c) is laminated, is less than 100%, means that the substrate (s) of the present invention has a surface roughness larger than the hard coat layer disclosed in Patent Literature 1 and the like, and simultaneously represents the preferable requirements that abrasion resistance of the laminate in which a water-repellent layer is laminated on a substrate having a surface roughness larger than the hard coat layer is enhanced.

The absolute value of Sa(c)/absolute value of Sa(s) is preferably not larger than 80%, more preferably not larger than 60%, even more preferably not larger than 40%, and particularly preferably not larger than 20%. The lower limit of the absolute value of Sa(c)/absolute value of Sa(s) is not particularly limited, and may be, for example, 1%.

In a preferable mode in which, in the substrate (s) of the present invention, the absolute value of the arithmetic average height Sa(s) is larger than the absolute value of the arithmetic average height of the hard coat layer as described above, as long as the condition that the absolute value of Sa(c)/absolute value of Sa(s) is less than 100% as described above is satisfied, the absolute value of the arithmetic average height Sa(s) of the substrate (s) before the layer (c) is laminated is not limited, but is, for example, not less than 0.01 μm. The absolute value of Sa(s) is preferably not larger than 5 μm, more preferably not larger than 3 μm, and even more preferably not larger than 1 μm, and, furthermore, still more preferably not larger than 0.8 μm and particularly preferably not larger than 0.5 μm. The value itself (not the absolute value) of the arithmetic average height Sa(s) of the substrate (s) before the layer (c) is laminated is preferably a negative value. That is, a recess is preferably formed. The arithmetic average height Sa is calculated in accordance with ISO 25178.

When the laminate of the present invention is evaluated in accordance with a method described below in Examples, the water contact angle (initial contact angle) is, for example, not less than 105°, and more preferably not less than 110°, and is, for example, not larger than 125°. After a abrasion resistance test described below in Examples has been performed, a water contact angle (contact angle after abrasion resistance test) is preferably not less than 85% of the contact angle before the abrasion resistance test, more preferably not less than 90% thereof, and generally not larger than 110% thereof.

When the laminate of the present invention is evaluated in accordance with a method described below in Examples, the sliding angle is not larger than 25°, preferably not larger than 20°, and more preferably not larger than 15°, and is, for example, not less than 2°. After a abrasion resistance test described below in Examples has been performed, a sliding angle is preferably not larger than 200% of the sliding angle before the abrasion resistance test, more preferably not larger than 150% thereof, and generally not less than 15% thereof.

Next, a production method for the laminate of the present invention will be described.

A first method for producing the laminate of the present invention includes (i) a step of applying the mixture composition (cc) to an anti-reflection layer surface of the substrate (s) having the anti-reflection layer, (ii) a step of applying the mixture composition (ca) to the surface to which the mixture composition (cc) has been applied, and (iii) a step of curing the mixture composition (cc) and the mixture composition (ca) to form the intermediate layer (c) from an applied layer of the mixture composition (cc), and form the water-repellent layer (r) from an applied layer of the mixture composition (ca).

As the method for applying the mixture composition (cc), a known method can be used, and a dip coating method is preferable.

Next, the mixture composition (ca) for forming the water-repellent layer (r) is applied to the surface to which the mixture composition (cc) has been applied and dried, whereby the intermediate layer (c) can be formed from the applied layer of the mixture composition (cc), and the water-repellent layer (r) can be formed from the applied layer of the mixture composition (ca). The intermediate layer (c) may be formed while the mixture composition (cc) is being applied or after the mixture composition (cc) has been applied, and formation of the intermediate layer (c) and formation of the water-repellent layer (r) may be caused to simultaneously progress. Examples of the method for applying the composition for forming the water-repellent layer (r) include a dip coating method, a roll coating method, a bar coater method, a spin coating method, a spray coating method, a die coater method, and a gravure coater method.

After the composition for forming the water-repellent layer (r) has been applied, the composition is left, as it is, at an ordinary temperature in the atmosphere for, for example, not shorter than one hour (and in general, not longer than 24 hours), to produce the laminate of the present invention. In the present invention, the ordinary temperature represents in a temperature range of 5 to 60° C., and preferably represents in a temperature range of 15 to 40° C. When the composition is left as it is at the ordinary temperature, the humidity may be 50 to 90% RH.

In a second method for producing the laminate of the present invention, the organosilicon compound (C) is vapor-deposited on an anti-reflection layer surface of the substrate (s) having the anti-reflection layer to form the layer (c), and the mixture composition (ca) is applied onto the intermediate layer (c) and cured, to form the water-repellent layer (r) from an applied layer of the mixture composition (ca). When the organosilicon compound (C) is vapor-deposited to form the intermediate layer (c), the organosilicon compound (C) as a single element may be vapor-deposited on the substrate (s), or a solid product (that is, the organosilicon compound (C)) obtained by removing a solvent from a mixture composition of the solvent and the organosilicon compound (C) may be vapor-deposited on the substrate (s). After the composition for forming the water-repellent layer (r) has been applied, the process may be performed in the same manner as in the first method.

Before the composition (cc) is applied or before the organosilicon compound (C) is vapor-deposited, the anti-reflection layer of the substrate (s) is preferably subjected to hydrophilization treatment. Examples of the hydrophilization treatment include corona treatment, plasma treatment, ultraviolet treatment, and ion cleaning, and plasma treatment and ion cleaning are more preferable. By performing the hydrophilization treatment such as plasma treatment, a functional group such as an OH group or a COOH group can be formed on the surface of the substrate. When such a functional group is formed on the surface of the substrate, adhesiveness between the intermediate layer (c) and the substrate (s) can be particularly enhanced. However, in a case where the laminate is used for a spectacle lens, the mixture composition (cc) is preferably applied or the organosilicon compound (C) is preferably vapor-deposited without performing the hydrophilization treatment on the anti-reflection layer of the substrate (s). Therefore, the hydrophilization treatment is preferably performed in a case where the laminate is used in usages other than spectacle lenses.

The laminate of the present invention can be preferably used as a front plate of a flexible display device, and the front plate may be referred to as a window film. The flexible display device preferably includes a laminate for the flexible display device and an organic EL display panel, and the laminate for the flexible display device is disposed on the viewing side with respect to the organic EL display panel, and is foldable. The laminate for the flexible display device may further include a polarizing plate (preferably, circularly polarizing plate), a touch sensor, and the like. These are laminated in any order, and the window film (that is, the laminate of the present invention), the polarizing plate, and the touch senor are preferably laminated in this order from the viewing side, or the window film, the touch sensor, and the polarizing plate are preferably laminated in this order from the viewing side. The polarizing plate is preferably disposed closer to the viewing side than the touch sensor is, because the pattern in the touch sensor is not easily viewed, and visibility of a display image is enhanced. The components can be laminated by using an adhesive, a tackiness agent, or the like. The flexible display device can have a light-shielding pattern formed on at least one surface of any of layers of the window film, the polarizing plate, and the touch sensor.

This application claims priority to Japanese Patent Application No. 2019-086595 filed on Apr. 26, 2019. The entire contents of the specification of Japanese Patent Application No. 2019-086595 filed on Apr. 26, 2019 are incorporated herein by reference.

EXAMPLES

The present invention will be described below in more detail by means of examples. The present invention is not limited by the following examples, and can also be carried out with appropriate modifications being made within the range of the gist described above and below, and any of these modifications are included in the technical scope of the present invention.

Example 1-1

Preparation of Solution for Forming Intermediate Layer (c)

A solution in which 0.5 mass % of an organosilicon compound (C) and 99.5 mass % of isopropyl alcohol as the solvent (E) were mixed, was stirred at room temperature to obtain a solution for forming the intermediate layer (c). The organosilicon compound (C) was a reaction product (trade name: X-12-5263HP, manufactured by Shin-Etsu Chemical Co., Ltd.), of N-2-(aminoethyl)-3-aminopropyltrimethoxysilane and chloropropyltrimethoxysilane, represented by the following formula and described in Japanese Laid-Open Patent Publication No. 2012-197330.

[Chemical Formula 28]

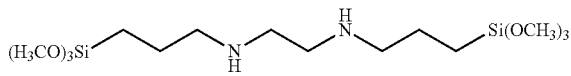

Preparation of Substrate (s)

A glass substrate (8 cm×8 cm, "EAGLE XG" manufactured by Corning) was subjected to hydrophilization treatment by ion cleaning. An anti-reflection coat (the anti-reflection layer (ar)) which was a multilayer film made of inorganic oxide (silica and zirconia) with a thickness of about 0.4 μm was formed by a vacuum vapor deposition method on the surface subjected to the hydrophilization treatment. Thus, a glass substrate having the anti-reflection layer (ar) formed thereon was obtained as the substrate (s). The substrate (s) was immersed in the solution for forming the intermediate layer (c) by using a dip coater (type DC4300) manufactured by Aiden under conditions that a liquid immersion time was 10 seconds and a taking-up speed was 10 mm/second, to form a film.

Next, a solution in which OPTOOL (registered trademark) UF503 manufactured by DAIKIN INDUSTRIES, LTD. as the organosilicon compound (A), FAS13E ($C_6F_{13}$—$C_2H_4$—$Si(OC_2H_5)_3$, manufactured by Tokyo Chemical Industry Co., Ltd.) as the organosilicon compound (B), and FC-3283 ($C_9F_{21}N$, Fluorinert, manufactured by 3M) as the solvent (D) were mixed, was prepared and stirred at room temperature for a predetermined time, to obtain a solution for forming the water-repellent layer (r). The OPTOOL (registered trademark) UF503 is an organosilicon compound in which a monovalent group having the perfluoropolyether structure and a hydrolyzable group are each bound to a silicon atom. In the solution for forming the water-repellent layer (r), when the entirety of the solution for forming the water-repellent layer (r) was determined as 100 mass %, a proportion of the organosilicon compound (A) was 0.425 mass %, and a proportion of the organosilicon compound (B) was 0.05 mass %. The solution for forming the water-repellent layer (r) was applied to a surface to which the solution for forming the intermediate layer (c) was applied (the surface means a surface, on the anti-reflection coat of the substrate, to which the solution for forming the intermediate layer (c)) by using a dip coater (type DC4300) manufactured by Aiden under conditions that a liquid immersion time was 10 seconds and a taking-up speed was 10 mm/second, to form a film. Thereafter, moist-heat curing was performed at 50° C. and 80% RH for 30 minutes.

Examples 1-2 to 1-9

The laminates were each obtained in the same manner as in Example 1-1 except that a concentration and a kind of the organosilicon compound (C), or a kind of the solvent (E) were changed as indicated in Table 1-1 and Table 1-2. In the Tables, KBM-603 represents N-2-(aminoethyl)-3-aminopropyltrimethoxysilane manufactured by Shin-Etsu Chemical Co., Ltd., FAS9E represents $C_4F_9$—$C_2H_4$—$Si(OC_2H_5)_3$ (manufactured by Tokyo Chemical Industry Co., Ltd.), and FAS3M represents $CF_3$—$C_2H_4$—$Si(OCH_3)_3$ (manufactured by Tokyo Chemical Industry Co., Ltd.). DSX represents OPTOOL (registered trademark) DSX manufactured by DAIKIN INDUSTRIES, LTD. and represents an organosilicon compound in which a monovalent group having the perfluoropolyether structure and a hydrolyzable group are each bound to a silicon atom.

Comparative Example 1-1

A laminate in which the substrate (s) and the water-repellent layer (r) were laminated in this order, was obtained in the same manner as in Example 1-1 except that the water-repellent layer (r) was directly formed on the substrate (s) without forming the intermediate layer (c). In Comparative example 1-1, the intermediate layer (c) was not formed. Therefore, the layer (c), specified by the present invention, before formation of the water-repellent layer (r) was not exactly present. However, in a preferable mode of the present invention, the arithmetic average height of the layer (c) before laminating of the water-repellent layer (r) is significant in order to specify the arithmetic average height of the surface on which the water-repellent layer (r) is laminated. From the viewpoint of the arithmetic average height Sa of the surface on which the water-repellent layer (r) was laminated, in Comparative example 1-1, it can also be said that the arithmetic average height Sa of the surface on which the water-repellent layer (r) was laminated was the arithmetic average height Sa of the substrate (s), and was the same value as the arithmetic average height Sa of the substrate (s) before formation of the layer (c) (that is, the ratio between absolute values of the arithmetic average heights was 100%).

The laminates obtained in Examples and Comparative examples were evaluated in the following methods.

(1-1) Initial Contact Angle and Initial Sliding Angle

Water droplet was dropped by 1 μL onto the water-repellent layer (r) of the obtained laminate, and a contact angle measurement device (DM700, manufactured by Kyowa Interface Science Co., Ltd) was used to measure a water contact angle with a liquid amount of 1 μL by using a θ/2 method.

Water droplet was dropped by 20 μL onto the water-repellent layer (r) of the obtained laminate, and the contact angle measurement device (DM700, manufactured by Kyowa Interface Science Co., Ltd) was used to measure a water sliding angle by a sliding method (analysis method: tangent method, inclination method: continuous inclination, sliding detection: after sliding, movement determination: advancing angle, sliding determination distance: 5 dot).

(1-2) Contact Angle and Sliding Angle After Abrasion Resistance Test

Using 16 laminated KIMWIPe wipers S-200 manufactured by NIPPON PAPER CRECIA CO., LTD. attached to a 15 mm×15 mm square elastic body (acrylic plate having a thickness of 1 mm), a 200 g load was applied to the water-repellent layer (r) of the obtained laminate, and a abrasion resistance test was performed 20,000 times at 30 mm stroke and 70 r/minute (70 reciprocations per one minute). A sliding angle was measured at almost the center of the abraded portion after the abrasion resistance test in the same manner as in above-described (1-1). After the abrasion resistance test, 1 μL of water droplet was dropped onto the water-repellent layer (r), and the contact angle measurement device (DM700, manufactured by Kyowa Interface Science Co., Ltd) was used to measure a water contact angle with a liquid amount of 1 μL by using a θ/2 method.

(1-3) Surface Reflectance

A colorimeter (CM-3700A, illuminant: D65) manufactured by KONICA MINOLTA, INC. was used and a spectral reflectance at a wavelength of 530 nm at an angle of incidence of 12° and an angle of reflection of 12° was calculated at 2-degree visual field (illuminant C) in JIS Z8701, on the surface on the water-repellent layer (r) side of the laminate. From the obtained value, the front surface reflection loss of 4.2% and the back surface reflection loss of 4.2% were subtracted to calculate a reflectance. The surface reflectance measured in the same manner as described above on each of the surfaces of the anti-reflection layers of the substrates (s) was 1.7%.

(1-4) Measurement of Fluorine Amount and Nitrogen Amount on Surface on Water-Repellent Layer (r) Side by XPS A fluorine amount (F1s) and a nitrogen amount were measured on the surface on the water-repellent layer (r) side by using Type JFS-9010 manufactured by JEOL Ltd with an excitation X-ray of MgKα, at X-ray output of 110 W, a photoelectron escape angle of 45°, and pass energy of 50 eV.

(1-5) Coefficient of Kinetic Friction

A coefficient of kinetic friction of the surface on the water-repellent layer (r) side was measured with artificial leather by using constant load measurement with Tribogear (surface property tester TYPE: 38) manufactured by SHINTO Scientific Co. Ltd under the following measurement conditions. A coefficient of kinetic friction was measured also after the abrasion resistance test was performed under the same conditions as described above in (1-2).

Load converter: 1.442 mV/V
Load: 1000 g
Movement distance: 20 mm
Movement speed: 600 mm/min
Sampling number: 210

(1-6) Measurement of Arithmetic Average Height Sa

Surfaces of the substrate (s) before formation of the intermediate layer (c) and the layer (c) before formation of the water-repellent layer (r) were observed at a magnification of 100 times by using a laser microscope LEXT OSL4000 manufactured by Olympus Corporation. The arithmetic average height Sa was evaluated in accordance with ISO 25178. The arithmetic average height Sa was an average value of N=3. The arithmetic average height of the substrate (s) before formation of the intermediate layer (c) was represented as Sa(s). The arithmetic average height of the intermediate layer (c) before formation of the layer (r) was represented as Sa(c).

The results for Examples 1-1 to 1-9 and Comparative example 1-1 are indicated in Table 1-1 and Table 1-2.

TABLE 1-1

| | | Example 1-1 | Example 1-2 | Example 1-3 | Example 1-4 | Example 1-5 |
|---|---|---|---|---|---|---|
| Water-repellent Layer (r) | Organosilicon Compound(A) | UF503 | UF503 | UF503 | UF503 | UF503 |
| | | 0.425% | 0.425% | 0.425% | 0.425% | 0.425% |
| | Organosilicon Compound(B) | FAS13E | FAS13E | FAS13E | FAS13E | FAS13E |
| | | 0.05% | 0.05% | 0.05% | 0.05% | 0.05% |
| | Solvent(D) | FC3283 | FC3283 | FC3283 | FC3283 | FC3283 |
| Intermediate Layer (c) | Organosilicon Compound(C) | X-12-5263HP | X-12-5263HP | X-12-5263HP | KBM-603 | KBM-603 |
| | | 0.50% | 0.25% | 0.25% | 0.25% | 0.25% |
| | Solvent (E) | Isopropyl Alcohol | Methyl Ethyl Ketone | Hexane | Isopropyl Alcohol | Acetone |
| | XPS F amount(atomic %) | 50.21 | 48.97 | 49.27 | 52.14 | 55.24 |
| | XPS N amount(atomic %) | 2.87 | 2.68 | 3.18 | 1.65 | 1.85 |
| | Initial Contact Angle (°) | 113.0 | 113.6 | 113.4 | 114.3 | 114.4 |
| | Initial Sliding Angle (°) | 17.0 | 12.0 | 12.0 | 16.0 | 11.0 |
| | Contact Angle After Paper Abrasion Resistance Test (°) | 118.2 | 117.9 | 118.0 | 114.6 | 114.6 |

TABLE 1-1-continued

|  | Example 1-1 | Example 1-2 | Example 1-3 | Example 1-4 | Example 1-5 |
|---|---|---|---|---|---|
| Sliding Angle After Paper Abrasion Resistance Test (°) | 3.0 | 4.0 | 4.0 | 7.0 | 13.0 |
| Reflectance(%) 530 nm | 2.52 | 1.81 | 1.56 | 2.07 | 1.81 |
| Coefficient of Kinetic Friction | 0.25 | 0.27 | 0.23 | 0.28 | 0.22 |
| Coefficient of Kinetic Friction After Paper Abrasion Resistance Test | 0.18 | 0.25 | 0.21 | 0.29 | 0.25 |
| Contact Angle After Abrasion Resistance Test/ Initial Contact Angle (%) | 104.6 | 103.8 | 104.1 | 100.3 | 100.2 |
| Sliding Angle After Abrasion Resistance Test/ Initial Sliding Angle (%) | 17.6 | 33.3 | 33.3 | 43.8 | 118.2 |
| Sa (s) of Substrate (s) before Formation of Layer (c) (μm) (Absolute Value) | 0.07 | 0.07 | 0.07 | 0.07 | 0.07 |
| Sa (c) of Layer (c) before Formation of Layer (r) (μm) (Absolute Value) | 0.005 | 0.047 | 0.041 | 0.007 | 0.039 |
| Absolute Value of Sa(c)/ Absolute Valute of Sa (s) (%) | 7.14 | 67.14 | 58.57 | 10.00 | 55.71 |

TABLE 1-2

|  |  | Example 1-6 | Example 1-7 | Example 1-8 | Example 1-9 | Comparative Example 1-1 |
|---|---|---|---|---|---|---|
| Water-repellent Layer (r) | Organosilicon Compound(A) | UF503 0.425% | UF503 0.425% | UF503 0.425% | DSX 0.425% | UF503 0.425% |
|  | Organosilicon Compound(B) | FAS13E 0.05% | FAS9E 0.05% | FAS3M 0.05% | FAS13E 0.05% | FAS13E 0.05% |
|  | Solvent(D) | FC3283 | FC3283 | FC3283 | FC3283 | FC3283 |
| Intermediate Layer (c) | Organosilicon Compound(C) | X-12-5263HP 0.25% | X-12-5263HP 0.25% | X-12-5263HP 0.25% | X-12-5263HP 0.25% | — |
|  | Solvent (E) | Butyl Acetate | Butyl Acetate | Butyl Acetate | Butyl Acetate | — |
| XPS F amount(atomic %) |  | 49.37 | 50.31 | 50.11 | 48.22 | 46.02 |
| XPS N a mount(atomic %) |  | 3.09 | 3.02 | 3.05 | 2.98 | 0.12 |
| Initial Contact Angle (°) |  | 118.2 | 113.5 | 114.7 | 109.1 | 114.3 |
| Initial Sliding Angle (°) |  | 8.0 | 7.0 | 9.0 | 7.0 | 15.0 |
| Contact Angle After Paper Abrasion Resistance Test (°) |  | 118.9 | 118.9 | 118.6 | 106.5 | 91.1 |
| Sliding Angle After Paper Abrasion Resistance Test (°) |  | 4.0 | 5.0 | 5.0 | 46.0 | 67.2 |
| Reflectance(%) 530 nm |  | 1.94 | 1.92 | 1.90 | 2.01 | 1.55 |
| Coefficient of Kinetic Friction |  | 0.22 | 0.23 | 0.24 | 0.28 | 0.32 |
| Coefficient of Kinetic Friction After Paper Abrasion Resistance Test |  | 0.21 | 0.22 | 0.22 | 0.31 | 0.44 |
| Contact Angle After Abrasion Resistance Test/ Initial Contact Angle (%) |  | 100.6 | 104.8 | 103.4 | 97.6 | 79.7 |
| Sliding Angle After Abrasion Resistance Test/ Initial Sliding Angle (%) |  | 50.0 | 71.4 | 55.6 | 657.1 | 448.0 |
| Sa (s) of Substrate (s) before Formation of Layer (c) (μm) (Absolute Value) |  | 0.07 | 0.07 | 0.07 | 0.07 | 0.07 |
| Sa (c) of Layer (c) before Formation of Layer (r) (μm) (Absolute Value) |  | 0.027 | 0.027 | 0.027 | 0.027 | — |
| Absolute Value of Sa(c)/ Absolute Val ute of Sa (s) (%) |  | 38.57 | 38.57 | 38.57 | 38.57 | — |

Preparation of Solution for Forming Intermediate Layer (c)

A solution in which 0.25 mass % of an organosilicon compound (C) and 99.75 mass % of hexane as the solvent (E) were mixed, was stirred at room temperature to obtain a solution for forming the layer (c). The organosilicon compound (C) was a reaction product (trade name: X-12-5263HP, manufactured by Shin-Etsu Chemical Co., Ltd.), of N-2-(aminoethyl)-3-aminopropyltrimethoxysilane and chloropropyltrimethoxysilane, which was the same as in Example 1-1.

Preparation of Substrate (s)

Coating liquid was applied, in an immersion method, to a surface of NL3-SP (size of 75 mmφ, center thickness of 1.1 mm) manufactured by Nikon-Essilor Co., Ltd., and heated and cured, to laminate an urethane-based impact-resistance-enhancing coat (primer layer) having a thickness of about 1 μm and a silicone-based abrasion-resistance-enhancing hard coat having a thickness of about 2 μm in this order. Next, an anti-reflection coat (the anti-reflection layer (ar)) which was a multilayer film made of inorganic oxide (silica and zirconia) with a thickness of about 0.4 μm was formed on the silicone-based abrasion-resistance-enhancing hard coat (hard coat layer) by a vacuum vapor deposition method, to obtain a plastic spectacle lens as the substrate (s). The substrate (s) was immersed in the solution for forming the intermediate layer (c) by using a dip coater (type DC4300) manufactured by Aiden under conditions that a liquid immersion time was 10 seconds and a taking-up speed was 10 mm/second, to form a film.

Next, a solution in which OPTOOL (registered trademark) UF503 manufactured by DAIKIN INDUSTRIES, LTD. as the organosilicon compound (A), FAS13E ($C_6F_{13}$—$C_2H_4$—$Si(OC_2H_5)_3$, manufactured by Tokyo Chemical Industry Co., Ltd.) as the organosilicon compound (B), and FC-3283 ($C_9F_{21}N$, Fluorinert, manufactured by 3M) as the solvent (D) were mixed, was prepared, and stirred at room temperature for a predetermined time, to obtain a solution for forming the water-repellent layer (r). In the solution for forming the water-repellent layer (r), when the entirety of the solution for forming the water-repellent layer (r) was determined as 100 mass %, a proportion of the organosilicon compound (A) was 0.425 mass % and a proportion of the organosilicon compound (B) was 0.05 mass %. The solution for forming the water-repellent layer (r) was applied to a surface to which the solution for forming the intermediate layer (c) was applied (the surface means a surface, on the anti-reflection coat of the substrate, to which the solution for forming the intermediate layer (c) was applied) by using a dip coater (type DC4300) manufactured by Aiden under conditions that a liquid immersion time was 10 seconds and a taking-up speed was 10 mm/second, to form a film. Thereafter, moist-heat curing was performed at 50° C. and 80% RH for 30 minutes.

Example 2-2

A laminate was obtained in the same manner as in Example 2-1 except that the solvent (E) of the solution for forming the intermediate layer (c) was changed from hexane to butyl acetate.

Comparative Example 2-1

A laminate in which the substrate (s) and the water-repellent layer (r) were laminated in this order, was obtained in the same manner as in Example 2-1 except that the water-repellent layer (r) was directly formed on the substrate (s) without forming the layer (c). In Comparative example 2-1, the layer (c) was not formed. Therefore, the intermediate layer (c), specified by the present invention, before formation of the water-repellent layer (r) was not exactly present. However, in a preferable mode of the present invention, the arithmetic average height of the layer (c) before laminating of the water-repellent layer (r) is significant in order to specify the arithmetic average height of the surface on which the water-repellent layer (r) is laminated. From the viewpoint of the arithmetic average height Sa of the surface on which the water-repellent layer (r) was laminated, in Comparative example 2-1, it can also be said that the arithmetic average height Sa of the surface on which the water-repellent layer (r) was laminated was the arithmetic average height Sa of the substrate (s), and was the same value as the arithmetic average height Sa of the substrate (s) before formation of the intermediate layer (c) (that is, the ratio between absolute values of the arithmetic average heights was 100%).

Examples 2-1 and 2-2, and Comparative example 2-1 were evaluated in the following method.

(2-1) Initial Contact Angle and Initial Sliding Angle

Water droplet was dropped by 1 μL onto the water-repellent layer (r) of the obtained laminate, and a contact angle measurement device (DM-500/DM-SA, manufactured by Kyowa Interface Science Co., Ltd) was used to measure a water contact angle by a sessile drop method (analysis method: ellipse fitting).

Water droplet was dropped by 20 μL onto the water-repellent layer (r) of the obtained laminate, and the contact angle measurement device (DM-500/DM-SA, manufactured by Kyowa Interface Science Co., Ltd) was used to measure a water sliding angle by a sliding method (analysis method: perfect circle fitting, inclination method: continuous inclination, sliding detection: before sliding, movement determination: advancing and receding, slipping determination distance: 10 dot).

(2-2) Contact Angle and Sliding Angle After Abrasion Resistance Test

Using 16 laminated KIMWIPe wipers S-200 manufactured by NIPPON PAPER CRECIA CO., LTD. attached to a 15 mm×15 mm square elastic body (plastic eraser, Type 1156SMTR00 manufactured by Maped (France)), a 200 g load was applied to the water-repellent layer (r) of the obtained laminate, and the water-repellent layer (r) was rubbed 20000 times at a 30 mm stroke and 90 r/minute (90 reciprocations per one minute) to perform a abrasion resistance test, and a sliding angle was measured after the abrasion resistance test in the same manner as in the above-described (2-1).

After the abrasion resistance test, 1 μL of water droplet was dropped onto the water-repellent layer (r), and the contact angle measurement device (DM-500/DM-SA, manufactured by Kyowa Interface Science Co., Ltd) was used to measure a water contact angle by a sessile drop method (analysis method: ellipse fitting).

(2-3) Surface Reflectance

A reflectance of the surface of the water-repellent layer (r) of the laminate was measured with an objective lens of 10-fold magnification by using a lens reflectance measuring device (Type: USPM-RU, illuminant: halogen lamp) manufactured by Olympus Corporation, and a spectral reflectance at a wavelength of 530 nm was obtained by conversion with illuminant D65 and 10-degree visual field. The surface reflectance measured in the same manner as described above on each of the surfaces of the anti-reflection layers of the substrates (s) was 1.07%.

(2-4) Measurement of Fluorine Amount and Nitrogen Amount on Surface on Water-Repellent Layer (r) Side by XPS A fluorine amount (F1s) and a nitrogen amount were measured on the surface on the water-repellent layer (r) side by using Type JFS-9010 manufactured by JEOL Ltd with an excitation X-ray of MgKα, at X-ray output of 110 W, a photoelectron escape angle of 45°, and pass energy of 50 eV.

(2-5) Coefficient of Kinetic Friction

A coefficient of kinetic friction of the surface on the water-repellent layer (r) side was measured with artificial leather by using constant load measurement with Tribogear (surface property tester TYPE: 38) manufactured by SHINTO Scientific Co. Ltd under the following measurement conditions. A coefficient of kinetic friction was measured also after the abrasion resistance test was performed under the same conditions as described above in (2-2).

Load converter: 1.442 mV/V
Load: 1000 g
Movement distance: 20 mm
Movement speed: 600 mm/min
Sampling number: 210

(2-6) Measurement of Arithmetic Average Height Sa

The arithmetic average height Sa was measured in the same manner as in evaluation of Examples 1-1 to 1-6 and Comparative example 1-1

Table 2 indicates the results of Examples 2-1 and 2-2, and Comparative example 2-1.

TABLE 2

| | | Example 2-1 | Example 2-2 | Comparative Example 2-1 |
|---|---|---|---|---|
| Water-repellent Layer (r) | Organosilicon Compound(A) | UF503 0.425% | UF503 0.425% | UF503 0.425% |
| | Organosilicon Compound(B) | FAS13E 0.05% | FAS13E 0.05% | FAS13E 0.05% |
| | Solvent(D) | FC3283 | FC3283 | FC3283 |
| Intermediate Layer (c) | Organosilicon Compound(C) | X-12-5263HP 0.25% | X-12-5263HP 0.25% | — |
| | Solvent (E) | Hexane | Butyl Acetate | — |
| XPS F amount(atomic %) | | 55.31 | 47.82 | 49.39 |
| XPS N amount(atomic %) | | 2.21 | 3.31 | 0.31 |
| Initial Contact Angle (°) | | 117.1 | 120.3 | 115.2 |
| Initial Sliding Angle(°) | | 8.3 | 3.0 | 13.7 |
| Contact Angle After Paper Abrasion Resistance Test(°) | | 120.8 | 120.7 | 90.0 |
| Sliding Angle After Paper Abrasion Resistance Test (°) | | 7.0 | 2.0 | 62.3 |
| Reflectance(%) 530 nm | | 1.19 | 1.49 | 1.20 |
| Coefficient of Kinetic Friction | | 0.23 | 0.2 | 0.37 |
| Coefficient of Kinetic Friction After Paper Abrasion Resistance Test | | 0.23 | 0.21 | 0.98 |
| Sa (s) of Substrate (s) before Formation of Layer (c) (μm) (Absolute Value) | | 0.224 | 0.224 | 0.224 |
| Sa (c) of Layer (c) before Formation of Layer (r) (μm) (Absolute Value) | | 0.046 | 0.042 | — |
| Absolute Value of Sa(c)/ Absolute Valute of Sa (s) (%) | | 20.54 | 18.75 | — |
| Contact Angle After Abrasion Resistance Test/ Initial Contact Angle (%) | | 103.2 | 100.3 | 78.1 |
| Sliding Angle After Abrasion Resistance Test/ Initial Sliding Angle (%) | | 84.3 | 66.7 | 454.7 |

According to Table 1, in Examples 1-1 to 1-6, the contact angle and the sliding angle after the abrasion resistance test were good, the abrasion resistance was excellent, and the absolute value of Sa(c)/absolute value of Sa(s) according to the preferable requirements of the present invention was less than 100%. Meanwhile, in Comparative example 1-1 in which the intermediate layer (c) was not provided, the results were such that the contact angle and the sliding angle after the abrasion resistance test significantly deteriorated, and abrasion resistance was poor.

According to Table 2, in Examples 2-1 to 2-2, the contact angle and the sliding angle after the abrasion resistance test were good, the abrasion resistance was excellent, and the absolute value of Sa(c)/absolute value of Sa(s) according to the preferable requirements of the present invention was less than 100%. Meanwhile, in Comparative example 2-1 in which the intermediate layer (c) was not provided, the results were such that the contact angle and the sliding angle after the abrasion resistance test significantly deteriorated and abrasion resistance was poor.

INDUSTRIAL APPLICABILITY

The laminate of the present invention allows a film to be preferably formed for display devices such as touch panel displays, optical devices, semiconductor devices, construction materials, nanoimprint technology, solar batteries, window glass of automobiles and buildings, metal products such as cookware, ceramic products such as tableware, plastic automobile components, and the like, and is industrially useful. Furthermore, the laminate of the present invention is preferably used for products of each component for kitchens, bathrooms, washstands, mirrors, and toilets, goggles, spectacle lenses, and the like.

The invention claimed is:

1. A laminate comprising:
a substrate (s) having an anti-reflection layer;
an intermediate layer (c) placed on the anti-reflection layer side of the substrate; and
a water-repellent layer (r), in this order, wherein
the intermediate layer (c) is a cured layer of a mixture composition (cc) of an organosilicon compound (C), or a vapor deposition layer of the organosilicon compound (C),
the organosilicon compound (C) contains a silicon atom together with an amino group and/or an amine skeleton,
the organosilicon compound (C) is an organosilicon compound represented by the following formula (c2),

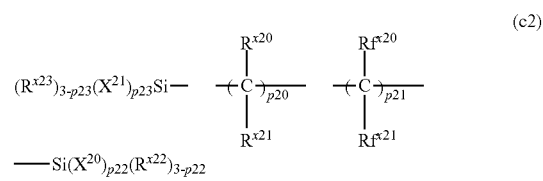

in the formula (c2),
$R^{x20}$ and $R^{x21}$ each independently represent a hydrogen atom or an alkyl group having 1 to 4 carbon atoms,
when the number of $R^{x20}$s is plural, the plurality of $R^{x20}$s may be different from each other,
when the number of $R^{x21}$s is plural, the plurality of $R^{x21}$s may be different from each other,
$Rf^{x20}$ and $Rf^{x21}$ each independently represent a fluorine atom, or an alkyl group having 1 to 20 carbon atoms in which one or more hydrogen atom is substituted by a fluorine atom, when the number of $Rf^{x20}$s is plural, the plurality of $Rf^{x20}$s may be different from each other, when the number of $Rf^{x21}$s is plural, the plurality of $Rf^{x21}$s may be different from each other, $R^{x22}$ and $R^{x23}$ each independently represent an alkyl group having 1 to 20 carbon atoms, when the numbers of $R^{x22}$s and $R^{x23}$s are plural, the plurality of $R^{x22}$s and the plurality of $R^{x23}$s may be different from each other, $X^{20}$ and $X^{21}$ each independently represent a hydrolyzable group, when the numbers of $X^{20}$s and $X^{21}$s are plural, the plurality of $X^{20}$s and the plurality of $X^{21}$s may be different from each other, p20 represents an integer of 1 to 30, p21 represents an integer of 0 to 30, at least one of repeating units bracketed with p20 or p21 is replaced by an amine skeleton $-NR^{100}$, $R^{100}$ in the amine skeleton represents a hydrogen atom or an alkyl group, p22 and p23 each independently represent an integer of 1 to 3, and $-\{C(R^{x20})(R^{x21})\}-$ whose number is p20 and $-\{C(Rf^{x20})(Rf^{x21})\}-$ whose number is p21 are aligned and bound in any order, p20 or p21 units may not necessarily be continuous, and both ends are $-Si(X^{20})_{p22}(R^{x22})_{3-p22}$ and $-Si(X^{21})_{p23}(R^{x23})_{3-p23}$, the water-repellent layer (r) is a cured layer of a mixture composition (ca) of an organosilicon compound (A) in which a monovalent group having a perfluoropolyether structure is bound to a silicon atom through a linking group located therebetween or without a linking group located therebetween, and a hydrolyzable group is bound to the silicon atom through a linking group located therebetween or without a linking group located therebetween, and the laminate satisfies the following requirement (1), (1) a water sliding angle is not larger than 50° after a abrasion resistance test in which a 200 g load per 1.5 cm×1.5 cm area is applied to a surface on the water-repellent layer (r) side of the laminate and the surface is rubbed 20,000 times.

2. The laminate according to claim 1, wherein the organosilicon compound (A) is at least one kind of organosilicon compounds represented by the following formula (a1), when the number of $R^{12}$s is plural, the plurality of $R^{12}$s may be different from each other, when the number of $R^{13}$s is plural, the plurality of $R^{13}$s may be different from each other, $E^1$, $E^2$, $E^3$, $E^4$, and $E^5$ each independently represent a hydrogen atom or a fluorine atom, when the number of $E^1$s is plural, the plurality of $E^1$s may be different from each other, when the number of $E^2$s is plural, the plurality of $E^2$s may be different from each other, when the number of $E^3$s is plural, the plurality of $E^3$s may be different from each other, when the number of $E^4$s is plural, the plurality of $E^4$s may be different from each other, $G^1$ and $G^2$ each independently represent a 2 to 10 valent organosiloxane group having a siloxane bond, $J^1$, $J^2$, and $J^3$ each independently represent a hydrolyzable group or $-(CH_2)_{e6}-Si(OR^{14})_3$, e6 represents 1 to 5, $R^{14}$ represents a methyl group or an ethyl group, when the number of $J^1$s is plural, the plurality of $J^1$s may be different from each other, when the number of $J^2$s is plural, the plurality of $J^2$s may be different from each other, when the number of $J^3$s is plural, the plurality of $J^3$s may be different from each other, $L^1$ and $L^2$ each independently represent a divalent linking group that has 1 to 12 carbon atoms and may contain an oxygen atom, a nitrogen atom, or a fluorine atom, when the number of $L^1$s is plural, the plurality of $L^1$s may be different from each other, when the number of $L^2$s is plural, the plurality of $L^2$s may be different from each other, d11 represents 1 to 9, d12 represents 0 to 9, a10 and a14 each independently represent 0 to 10, a11 and a15 each independently represent 0 or 1, a12 and a16 each independently represent 0 to 9, a13 represents 0 or 1, a21, a22, and a23 each independently represent 0 to 2, and e1, e2, and e3 each independently represent 1 to 3.

3. The laminate according to claim 1, wherein the mixture composition (ca) further contains at least one kind of organosilicon compounds (B) represented by the following formula (b1),

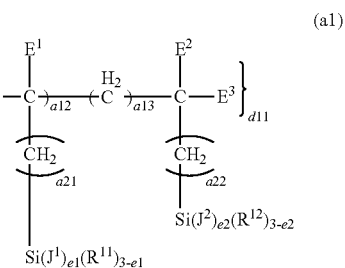

(a1)

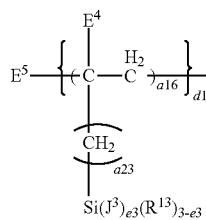

in the formula (a1), $Rf^{a1}$ represents a divalent perfluoropolyether structure having oxygen atoms at both ends, $R^{11}$, $R^{12}$, and $R^{13}$ each independently represent an alkyl group having 1 to 20 carbon atoms, when the number of $R^{11}$s is plural, the plurality of $R^{11}$s may be different from each other,

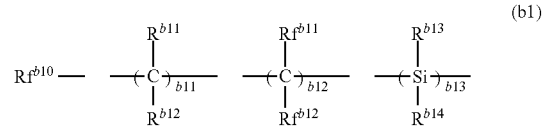

(b1)

-continued

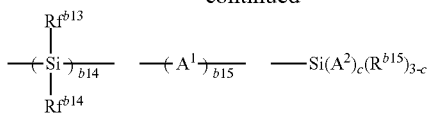

in the formula (b1), $Rf^{b10}$ represents a fluorine atom, or an alkyl group having 1 to 20 carbon atoms in which one or more hydrogen atom is substituted by a fluorine atom, $R^{b11}$, $R^{b12}$, $R^{b13}$, and $R^{b14}$ each independently represent a hydrogen atom or an alkyl group having 1 to 4 carbon atoms, when the number of $R^{b11}$s is plural, the plurality of $R^{b11}$s may be different from each other, when the number of $R^{b12}$s is plural, the plurality of $R^{b12}$s may be different from each other, when the number of $R^{b13}$s is plural, the plurality of $R^{b13}$s may be different from each other, when the number of $R^{b14}$s is plural, the plurality of $R^{b14}$s may be different from each other, $Rf^{b11}$, $Rf^{b12}$, $Rf^{b13}$, and $Rf^{b14}$ each independently represent a fluorine atom, or an alkyl group having 1 to 20 carbon atoms in which one or more hydrogen atom is substituted by a fluorine atom, when the number of $Rf^{b11}$s is plural, the plurality of $Rf^{b11}$s may be different from each other, when the number of $Rf^{b12}$s is plural, the plurality of $Rf^{b12}$s may be different from each other, when the number of $Rf^{b13}$s is plural, the plurality of $Rf^{b13}$s may be different from each other, when the number of $Rf^{b14}$s is plural, the plurality of $Rf^{b14}$s may be different from each other, $R^{b15}$ represents an alkyl group having 1 to 20 carbon atoms, when the number of $R^{b15}$s is plural, the plurality of $R^{b15}$s may be different from each other, $A^1$ represents —O—, —C(=O)—O—, —O—C(=O)—, —NR—, —NRC(=O)—, or —C(=O)NR—, R represents a hydrogen atom, an alkyl group having 1 to 4 carbon atoms, or a fluorine-containing alkyl group having 1 to 4 carbon atoms, when the number of $A^1$s is plural, the plurality of $A^1$s may be different from each other, $A^2$ represents a hydrolyzable group, when the number of $A^2$s is plural, the plurality of $A^2$s may be different from each other, b11, b12, b13, b14, and b15 each independently represent an integer of 0 to 100, c represents an integer of 1 to 3, and $Rf^{b10}$; - $Si(A^2)_c(R^{b15})_{3-c}$; —{C($R^{b11}$)($R^{b12}$)}— whose number is b11; —{C($Rf^{b11}$)($Rf^{b12}$)}-whose number is b12; —{Si($R^{b13}$)($R^{b14}$)}— whose number is b13; —{Si($Rf^{b13}$)($Rf^{b14}$)}— whose number is b14; and -$A^1$- whose number is b15 are aligned and bound in any order as long as $Rf^{b10}$— and —$Si(A^2)_c(R^{b15})_{3-c}$ are located at ends, no perfluoropolyether structure is formed, and —O— does not link to —O— and —F.

4. The laminate according to claim 3, wherein, in the mixture composition (ca), a mass ratio of the organosilicon compound (B) to the organosilicon compound (A) is 0.05 to 2.0.

5. The laminate according to claim 1, wherein the organosilicon compound (A) is a compound represented by the following formula (a3) or (a4), and the organosilicon compound (C) is a compound represented by the following formula (c2-2),

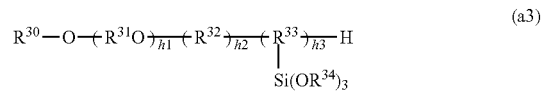

in the formula (a3), $R^{30}$ represents a perfluoroalkyl group having 2 to 6 carbon atoms, $R^{31}$ and $R^{32}$ each independently represent a perfluoroalkylene group having 2 to 6 carbon atoms, $R^{33}$ represents a trivalent saturated hydrocarbon group having 2 to 6 carbon atoms, and $R^{34}$ represents an alkyl group having 1 to 3 carbon atoms, h1 represents 5 to 70, h2 represents 1 to 5, h3 represents 1 to 10,

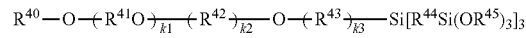

in the formula (a4), $R^{40}$ represents a perfluoroalkyl group having 2 to 5 carbon atoms, $R^{41}$ represents a perfluoroalkylene group having 2 to 5 carbon atoms, $R^{42}$ represents a fluoroalkylene group in which a part of hydrogen atoms of an alkylene group having 2 to 5 carbon atoms is substituted by fluorine, $R^{43}$ and $R^{44}$ each independently represent an alkylene group having 2 to 5 carbon atoms, $R^{45}$ represents a methyl group or an ethyl group, and k1, k2, and k3 each independently represent an integer of 1 to 5,

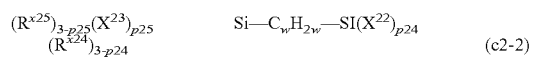

in the formula (c2-2), $X^{22}$ and $X^{23}$ each independently represent a hydrolyzable group, when the numbers of $X^{22}$s and $X^{23}$s are plural, the plurality of $X^{22}$s and the plurality of $X^{23}$s may be different from each other, $R^{x24}$ and $R^{x25}$ each independently represent an alkyl group having 1 to 20 carbon atoms, when the numbers of $R^{x24}$s and $R^{x25}$s are plural, the plurality of $R^{x24}$s and the plurality of $R^{x25}$s may be different from each other, at least one methylene group in a part of —$C_wH_{2w}$— is replaced by an amine skeleton —$NR^{100}$—, $R^{100}$ represents a hydrogen atom or an alkyl group, w represents an integer of 1 to 30 (excluding the number of methylene group replaced by the amine skeleton), and p24 and p25 each independently represent an integer of 1 to 3.

6. The laminate according to claim 1, wherein a property measured on a surface on the water-repellent layer side further satisfies at least one of the following requirements (1') and (3), (1') a water contact angle after the abrasion resistance test is not less than 90°, and (3) an initial water sliding angle is not larger than 21°.

7. The laminate according to claim 1, wherein the property measured on the surface on the water-repellent layer side further satisfies the following requirement (4),
   (4) a coefficient of kinetic friction after the abrasion resistance test is not larger than 0.40.

8. The laminate according to claim 1, wherein an F amount is not less than 5 atom % and an N amount is not less than 0.15 atom % on a surface of the laminate on the water-repellent layer (r) side in XPS measurement of the surface.

9. The laminate according to claim 1, wherein a ratio (absolute value of Sa(c)/absolute value of Sa(s)) of an absolute value of an arithmetic average height Sa(c) of the intermediate layer (c) before the water-repellent layer (r) is laminated, relative to an absolute value of an arithmetic average height Sa(s) of the substrate (s) before the intermediate layer (c) is laminated, is less than 100%.

10. The laminate according to claim 1, wherein the substrate (s) is a glass layer or a resin layer on which the anti-reflection layer is formed.

11. A spectacle lens comprising the laminate according to claim 1.

* * * * *